US012756529B2

(12) United States Patent
Raghavan et al.

(10) Patent No.: US 12,756,529 B2
(45) Date of Patent: Oct. 6, 2026

(54) TECHNIQUES FOR DECLARING DEFAULT OPERATING FREQUENCIES

(71) Applicant: QUALCOMM Incorporated, San Diego, CA (US)

(72) Inventors: Vasanthan Raghavan, West Windsor Township, NJ (US); Arumugam Chendamarai Kannan, San Diego, CA (US); Srinivas Yerramalli, Hyderabad (IN); Tao Luo, San Diego, CA (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 17/382,215

(22) Filed: Jul. 21, 2021

(65) Prior Publication Data

US 2022/0038249 A1 Feb. 3, 2022

Related U.S. Application Data

(60) Provisional application No. 63/058,288, filed on Jul. 29, 2020.

(51) Int. Cl.
*H04L 5/00* (2006.01)
*H04B 7/0456* (2017.01)
(Continued)

(52) U.S. Cl.
CPC ......... *H04L 5/0098* (2013.01); *H04B 7/0608* (2013.01); *H04W 72/0453* (2013.01)

(58) Field of Classification Search
CPC ............... H04W 72/04; H04W 72/048; H04W 72/0453; H04W 72/21; H04W 72/29;
(Continued)

(56) References Cited

U.S. PATENT DOCUMENTS 10,856,139 B2 * 12/2020 Kim ........................ H04W 8/24
10,944,442 B1 * 3/2021 Mehrnia ............... H04L 7/0033
(Continued)

FOREIGN PATENT DOCUMENTS

CN 104584612 A 4/2015
CN 109315009 A 2/2019
(Continued)

OTHER PUBLICATIONS

International Search Report and Written Opinion—PCT/US2021/042736—ISA/EPO—Oct. 26, 2021.
Taiwan Search Report—TW110127166—TIPO—Nov. 15, 2024.

*Primary Examiner* — Moo Jeong
*Assistant Examiner* — Scott A Schlack
(74) *Attorney, Agent, or Firm* — Holland & Hart LLP

(57) ABSTRACT

Methods, systems, and devices for wireless communications are described that provide for a wireless device to declare a default operating frequency. A first wireless device may identify one or more default operating frequencies for communicating over a bandwidth, where the default operating frequencies are predetermined by an antenna array configuration of the first wireless device. The first wireless device may transmit an indication of the one or more default operating frequencies to a second wireless device. The first wireless device or the second wireless device may select communications parameters for communicating over the bandwidth based on the one or more default operating frequencies. The first and second wireless devices may communicate over the bandwidth based on the one or more default operating frequencies.

25 Claims, 13 Drawing Sheets

(51) Int. Cl.
*H04B 7/06* (2006.01)
*H04W 72/0453* (2023.01)

(58) Field of Classification Search
CPC ..... H04W 72/51; H04W 28/06; H04W 28/16; H04W 28/0215; H04W 36/005; H04W 36/0066; H04B 7/0408; H04B 7/0413; H04B 7/0456; H04B 7/0626; H04B 7/0697
See application file for complete search history.

(56) References Cited

U.S. PATENT DOCUMENTS

| | | | | |
|---|---|---|---|---|
| 11,523,436 | B2 * | 12/2022 | Ingale ................. | H04W 52/242 |
| 12,401,990 | B2 * | 8/2025 | Jin .......................... | H04W 8/24 |
| 2012/0275531 | A1 * | 11/2012 | Wu ...................... | H04B 7/0689 375/267 |
| 2015/0327284 | A1 * | 11/2015 | Wakabayashi ........ | H04L 5/0092 370/252 |
| 2017/0201998 | A1 * | 7/2017 | Akiyama .............. | H04W 16/14 |
| 2018/0049224 | A1 * | 2/2018 | Dinan ............... | H04W 72/0453 |
| 2018/0123654 | A1 * | 5/2018 | Park ..................... | H04B 7/0626 |
| 2018/0255472 | A1 | 9/2018 | Chendamarai Kannan et al. | |
| 2019/0053175 | A1 * | 2/2019 | Kubota ................. | H04W 16/14 |
| 2019/0132110 | A1 | 5/2019 | Zhou et al. | |
| 2019/0239092 | A1 * | 8/2019 | Zhou ................. | H04W 72/0453 |
| 2019/0253925 | A1 * | 8/2019 | Gholmieh .............. | H04B 1/005 |
| 2020/0100236 | A1 * | 3/2020 | Tenny ..................... | H04W 8/22 |
| 2020/0112853 | A1 * | 4/2020 | Jiang ..................... | H04L 5/0062 |
| 2021/0067225 | A1 * | 3/2021 | Mo ....................... | H04L 5/0057 |
| 2021/0151864 | A1 * | 5/2021 | Xiao .................... | H01Q 3/2605 |
| 2021/0329444 | A1 * | 10/2021 | Wiemann ................ | H04W 8/24 |
| 2022/0086875 | A1 * | 3/2022 | Xu ........................ | H04W 72/23 |
| 2022/0394804 | A1 * | 12/2022 | Wang .................... | H04W 8/183 |

FOREIGN PATENT DOCUMENTS

| | | | |
|---|---|---|---|
| CN | 110430617 | A | 11/2019 |
| EP | 2501169 | A1 | 9/2012 |
| EP | 3154152 | A1 | 4/2017 |
| TW | 201924372 | A | 6/2019 |
| WO | WO-2019032908 | A1 | 2/2019 |
| WO | WO-2020022939 | A1 | 1/2020 |

* cited by examiner

TECHNIQUES FOR DECLARING DEFAULT OPERATING FREQUENCIES

CROSS REFERENCE

The present application for patent claims the benefit of U.S. Provisional Patent Application No. 63/058,288 by RAGHAVAN et al., entitled "TECHNIQUES FOR DECLARING DEFAULT OPERATING FREQUENCIES," filed Jul. 29, 2020, assigned to the assignee hereof, and expressly incorporated by reference herein.

FIELD OF TECHNOLOGY

The present disclosure relates to wireless communications, including techniques for declaring default operating frequencies.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support beamformed communications using one or multiple antenna arrays. However, communications performance over some frequency ranges may, in some cases, be affected by a configuration of a UE's antenna array.

SUMMARY

The described techniques relate to improved methods, systems, devices, and apparatuses that support techniques for declaring default operating frequencies. Generally, the described techniques enable a wireless device to identify one or more default operating frequencies within an ultra-wide bandwidth and transmit an indication of the default operating frequencies to one or more other wireless devices. Another wireless device receiving the indication of the default operating frequencies may in turn adjust communications parameters according to the default operating frequencies. The default operating frequencies may be device-specific and may be based on a hardware configuration (e.g., a number of radio frequency (RF) chains, antenna element spacing, or the like) for communications over the ultra-wide bandwidth. As an example, a first wireless device may indicate, to a second wireless device, a first default operating frequency based on an antenna configuration of the first wireless device. The second wireless device may use the indication of the default operating frequency to modify or adjust one or more communications parameters to enhance communications performance for transmissions between the devices.

A method of wireless communication at a first wireless device is described. The method may include identifying, by the first wireless device, one or more default operating frequencies for communicating over a bandwidth, each default operating frequency of the one or more default operating frequencies being predetermined by an antenna array configuration of the first wireless device, transmitting, to a second wireless device, a message including an indication of the one or more default operating frequencies of the first wireless device, and communicating with the second wireless device over the bandwidth based on the one or more default operating frequencies.

An apparatus for wireless communication at a first wireless device is described. The apparatus may include a processor, memory coupled with the processor, and instructions stored in the memory. The instructions may be executable by the processor to cause the apparatus to identify, by the first wireless device, one or more default operating frequencies for communicating over a bandwidth, each default operating frequency of the one or more default operating frequencies being predetermined by an antenna array configuration of the first wireless device, transmit, to a second wireless device, a message including an indication of the one or more default operating frequencies of the first wireless device, and communicate with the second wireless device over the bandwidth based on the one or more default operating frequencies.

Another apparatus for wireless communication at a first wireless device is described. The apparatus may include means for identifying, by the first wireless device, one or more default operating frequencies for communicating over a bandwidth, each default operating frequency of the one or more default operating frequencies being predetermined by an antenna array configuration of the first wireless device, transmitting, to a second wireless device, a message including an indication of the one or more default operating frequencies of the first wireless device, and communicating with the second wireless device over the bandwidth based on the one or more default operating frequencies.

A non-transitory computer-readable medium storing code for wireless communication at a first wireless device is described. The code may include instructions executable by a processor to identify, by the first wireless device, one or more default operating frequencies for communicating over a bandwidth, each default operating frequency of the one or more default operating frequencies being predetermined by an antenna array configuration of the first wireless device, transmit, to a second wireless device, a message including an indication of the one or more default operating frequencies of the first wireless device, and communicate with the second wireless device over the bandwidth based on the one or more default operating frequencies.

Some examples of the method, apparatuses, and non-transitory computer-readable medium described herein may further include operations, features, means, or instructions for receiving a first system information including a parameter that indicates a mapping for a set of one or more cells, where each cell of the set of one or more cells operates using at least one antenna array configuration that may be the same as the antenna array configuration as the first wireless device, storing the first system information including the parameter, comparing the stored first system information with a second system information received from a first cell of the set of one or more cells, and communicating with one or more wireless devices associated with the first cell using the one or more default operating frequencies based on the comparison.

Some examples of the method, apparatuses, and non-transitory computer-readable medium described herein may further include operations, features, means, or instructions for receiving, from the second wireless device, a second message including an indication of one or more default operating frequencies of the second wireless device, and determining the one or more default operating frequencies of the second wireless device based on the second message, where the one or more default operating frequencies of the second wireless device may be determined by at least an antenna configuration of the second wireless device, or one or more carrier frequencies associated with an analog beamforming codebook of the second wireless device, or a frequency band from a set of frequency bands, or a channel from a set of channels, or any combination thereof.

Some examples of the method, apparatuses, and non-transitory computer-readable medium described herein may further include operations, features, means, or instructions for selecting one or more communications parameters based on the one or more default operating frequencies of the first wireless device and the one or more default operating frequencies of the second wireless device, where communicating with the second wireless device over the bandwidth may be based on the selected one or more communications parameters.

In some examples of the method, apparatuses, and non-transitory computer-readable medium described herein, the one or more communications parameters include beamforming parameters of the analog beamforming codebook associated with an antenna array of the first wireless device.

Some examples of the method, apparatuses, and non-transitory computer-readable medium described herein may further include operations, features, means, or instructions for selecting at least the frequency band, or the channel, or any combination thereof, for communicating with the second wireless device based on the one or more default operating frequencies of the first wireless device and the one or more default operating frequencies of the second wireless device, where communicating with the second wireless device over the bandwidth may be based on the selected frequency band, or the channel, or any combination thereof.

Some examples of the method, apparatuses, and non-transitory computer-readable medium described herein may further include operations, features, means, or instructions for determining that a first default operating frequency of the first wireless device and a second default operating frequency of the second wireless device satisfy a predetermined threshold difference, and selecting a third default operating frequency of the first wireless device based on the determination, the third default operating frequency being different from the first default operating frequency, where communicating with the second wireless device over the bandwidth may be based on the third default operating frequency.

In some examples of the method, apparatuses, and non-transitory computer-readable medium described herein, identifying the one or more default operating frequencies may include operations, features, means, or instructions for identifying a first operating frequency boundary and a second operating frequency boundary for each default operating frequency of the one or more default operating frequencies, the first operating frequency boundary being different from the second operating frequency boundary, where the indication of the one or more default operating frequencies includes an indication of at least the first operating frequency boundary, or the second operating frequency boundary, or any combination thereof.

In some examples of the method, apparatuses, and non-transitory computer-readable medium described herein, the first operating frequency boundary includes an upper frequency boundary and the second operating frequency boundary includes a lower frequency boundary, where one or more operating frequencies within the upper frequency boundary and the lower frequency boundary provide beamforming performance that satisfies a performance threshold, the performance threshold being based on a signal strength threshold for communications over the one or more operating frequencies.

In some examples of the method, apparatuses, and non-transitory computer-readable medium described herein, transmitting the message including the indication of the one or more default operating frequencies of the first wireless device may include operations, features, means, or instructions for transmitting, to the second wireless device, a capability message including the indication of the one or more default operating frequencies of the first wireless device.

In some examples of the method, apparatuses, and non-transitory computer-readable medium described herein, transmitting the message including the indication of the one or more default operating frequencies of the first wireless device may include operations, features, means, or instructions for transmitting, to the second wireless device, control information including the indication of the one or more default operating frequencies of the first wireless device.

In some examples of the method, apparatuses, and non-transitory computer-readable medium described herein, the one or more default operating frequencies of the first wireless device indicate performance metrics for a set of frequencies over the bandwidth.

In some examples of the method, apparatuses, and non-transitory computer-readable medium described herein, the one or more default operating frequencies of the first wireless device indicate the antenna array configuration of the first wireless device, the antenna array configuration including an inter-antenna element spacing of an antenna array having uniformly-spaced antenna elements or a non-uniformly-spaced antenna elements.

In some examples of the method, apparatuses, and non-transitory computer-readable medium described herein, the antenna array configuration includes a number of RF chains associated with an antenna array of the first wireless device.

In some examples of the method, apparatuses, and non-transitory computer-readable medium described herein, the one or more default operating frequencies may be specific to the first wireless device.

In some examples of the method, apparatuses, and non-transitory computer-readable medium described herein, the first wireless device or the second wireless device, or both, includes a user equipment (UE), a customer premises equipment (CPE), or a base station, or an integrated access and backhaul (IAB) node, or a wireless repeater, or a sidelink node.

A method of wireless communication at a first wireless device is described. The method may include receiving, from a second wireless device, a message including an indication of one or more default operating frequencies of the second wireless device, the one or more default operating frequencies for communicating over a bandwidth based on an antenna array configuration of the second wireless device, configuring one or more communications parameters based on one or more default operating frequencies of the first wireless device and the one or more default operating frequencies of the second wireless device, and communicating with the second wireless device over the bandwidth based on the one or more communications parameters.

An apparatus for wireless communication at a first wireless device is described. The apparatus may include a processor, memory coupled with the processor, and instructions stored in the memory. The instructions may be executable by the processor to cause the apparatus to receive, from a second wireless device, a message including an indication of one or more default operating frequencies of the second wireless device, the one or more default operating frequencies for communicating over a bandwidth based on an antenna array configuration of the second wireless device, configure one or more communications parameters based on one or more default operating frequencies of the first wireless device and the one or more default operating frequencies of the second wireless device, and communicate with the second wireless device over the bandwidth based on the one or more communications parameters.

Another apparatus for wireless communication at a first wireless device is described. The apparatus may include means for receiving, from a second wireless device, a message including an indication of one or more default operating frequencies of the second wireless device, the one or more default operating frequencies for communicating over a bandwidth based on an antenna array configuration of the second wireless device, configuring one or more communications parameters based on one or more default operating frequencies of the first wireless device and the one or more default operating frequencies of the second wireless device, and communicating with the second wireless device over the bandwidth based on the one or more communications parameters.

A non-transitory computer-readable medium storing code for wireless communication at a first wireless device is described. The code may include instructions executable by a processor to receive, from a second wireless device, a message including an indication of one or more default operating frequencies of the second wireless device, the one or more default operating frequencies for communicating over a bandwidth based on an antenna array configuration of the second wireless device, configure one or more communications parameters based on one or more default operating frequencies of the first wireless device and the one or more default operating frequencies of the second wireless device, and communicate with the second wireless device over the bandwidth based on the one or more communications parameters.

Some examples of the method, apparatuses, and non-transitory computer-readable medium described herein may further include operations, features, means, or instructions for transmitting system information including a parameter that indicates a mapping for a set of one or more cells, where each cell of the set of one or more cells operates using at least one antenna array configuration that may be the same as an antenna array configuration of the second wireless device.

Some examples of the method, apparatuses, and non-transitory computer-readable medium described herein may further include operations, features, means, or instructions for identifying, based on the one or more default operating frequencies, at least an antenna array configuration of the second wireless device, or one or more carrier frequencies corresponding to an analog beamforming codebook of the second wireless device, or any combination thereof, and selecting the one or more communications parameters based on the antenna array configuration of the second wireless device, the one or more carrier frequencies, or any combination thereof.

Some examples of the method, apparatuses, and non-transitory computer-readable medium described herein may further include operations, features, means, or instructions for identifying, based on the one or more default operating frequencies, at least a frequency band from a set of frequency bands, or a channel from a set of channels, or any combination thereof, and selecting the one or more communications parameters based on the frequency band, or the channel, or any combination thereof.

Some examples of the method, apparatuses, and non-transitory computer-readable medium described herein may further include operations, features, means, or instructions for estimating analog beamforming performance for a set of frequencies over the bandwidth, where the one or more default operating frequencies of the second wireless device indicate performance metrics for the set of frequencies.

Some examples of the method, apparatuses, and non-transitory computer-readable medium described herein may further include operations, features, means, or instructions for determining that a first default operating frequency of the first wireless device and a second default operating frequency of the second wireless device satisfy a predetermined threshold difference, and selecting a third default operating frequency of the first wireless device based on the determination, the third default operating frequency being different from the first default operating frequency, where communicating with the second wireless device within the bandwidth may be based on the third default operating frequency.

Some examples of the method, apparatuses, and non-transitory computer-readable medium described herein may further include operations, features, means, or instructions for identifying, from the indication of the one or more default operating frequencies, a first operating frequency boundary and a second operating frequency boundary for the one or more default operating frequencies of the second wireless device, the first operating frequency boundary being different from the second operating frequency boundary, where communicating with the second wireless device over the bandwidth may be based on the first operating frequency boundary, or the second operating frequency boundary, or any combination thereof.

In some examples of the method, apparatuses, and non-transitory computer-readable medium described herein, the first operating frequency boundary includes an upper frequency boundary and the second operating frequency boundary includes a lower frequency boundary, and where one or more operating frequencies within the upper frequency boundary and the lower frequency boundary provide beamforming performance that satisfies a performance threshold, the performance threshold being based on a signal strength threshold for communications over the one or more operating frequencies.

In some examples of the method, apparatuses, and non-transitory computer-readable medium described herein, the one or more communications parameters include analog beamforming parameters of an analog beamforming codebook associated with an antenna array of the second wireless device.

In some examples of the method, apparatuses, and non-transitory computer-readable medium described herein, receiving the indication of the one or more default operating frequencies of the second wireless device may include operations, features, means, or instructions for receiving, from the second wireless device, a capability message including the indication of the one or more default operating frequencies of the first wireless device.

In some examples of the method, apparatuses, and non-transitory computer-readable medium described herein, receiving the indication of the one or more default operating frequencies of the second wireless device may include operations, features, means, or instructions for receiving, from the second wireless device, control information including the indication of the one or more default operating frequencies of the first wireless device.

In some examples of the method, apparatuses, and non-transitory computer-readable medium described herein, the one or more default operating frequencies of the second wireless device indicate an antenna array configuration of the second wireless device, the antenna array configuration including an inter-antenna element spacing of an antenna array having uniformly-spaced antenna elements or a non-uniformly-spaced antenna elements.

DETAILED DESCRIPTION

Figure 1:
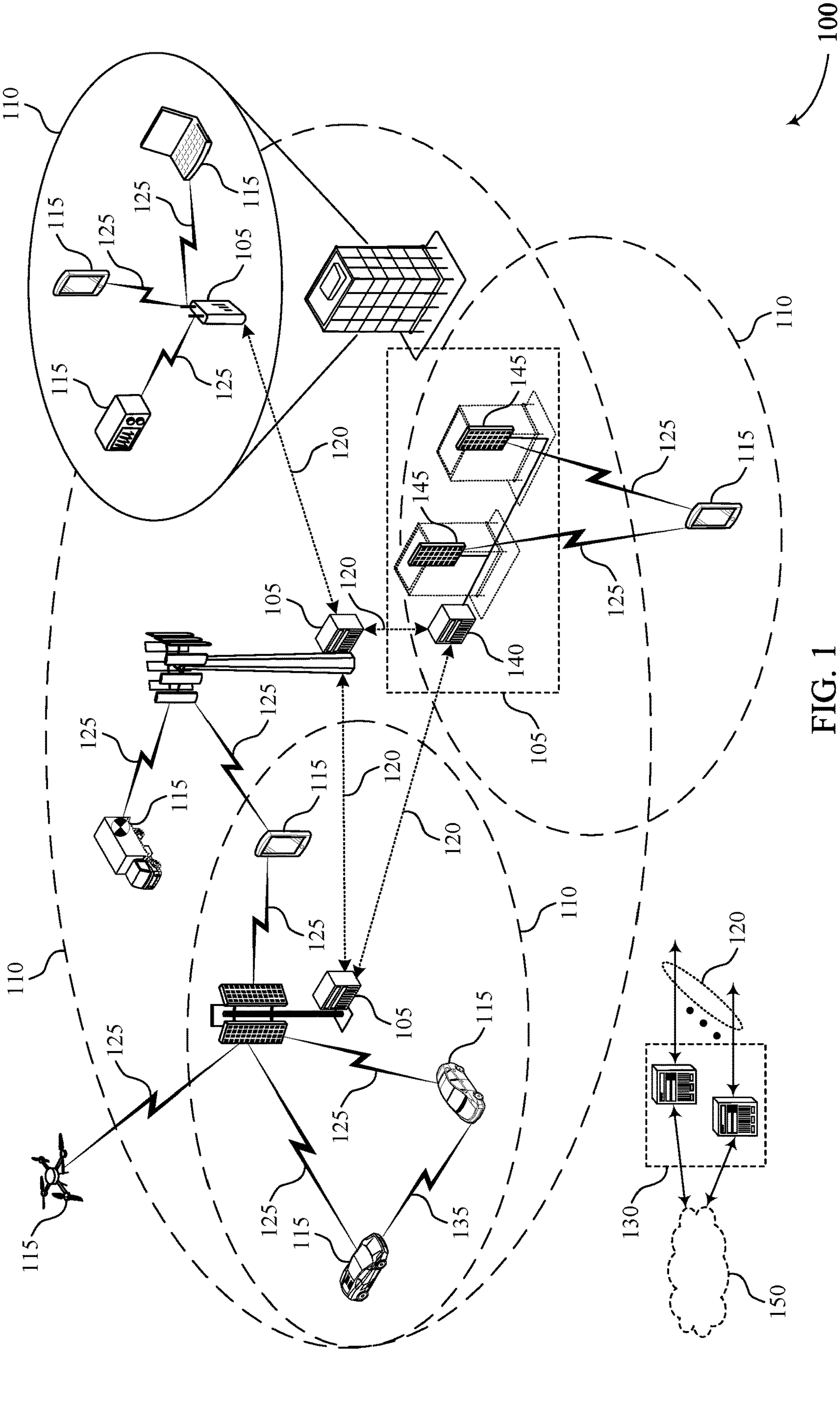
FIG. 1 illustrates an example of a wireless communications system that supports techniques for declaring default operating frequencies in accordance with aspects of the present disclosure.

Some wireless communications systems may support wireless communications in relatively high frequency ranges, such as in frequency range 4 (FR4) (e.g., including 52.6 gigahertz (GHz)-114.25 GHz bands), which may be referred to as upper millimeter wave (mmW) bands, a sub-THz regime, or the like. Communications in such frequency ranges may utilize an ultra-wide bandwidth (e.g., a 14 GHz bandwidth, a 25 GHz bandwidth, a bandwidth greater than 3 GHz, or the like), which may enable enhanced communications performance at the corresponding frequencies. However, a wireless device (e.g., a UE, a base station, or the like) may have limited capabilities for communications over all bands or frequencies of the ultra-wide bandwidth. As an example, a single radio frequency (RF) chain for an antenna array at the wireless device may be used for the entire ultra-wide bandwidth, but the RF chain may have a hardware configuration (e.g., an inter-antenna element spacing) suited for beamforming over a subset of frequencies (e.g., a relatively limited number of frequencies) within the bandwidth. For example, the inter-antenna element spacing may be fixed at a value that may provide optimal beamforming performance at some frequency (e.g., an anchor frequency or a default operating frequency). This spacing, however, may result in array gain and/or beamforming loss at frequencies different from the default operating frequency (e.g., above or below the anchor frequency), which may result in beam shape distortion of main, side, and/or grating lobes (e.g., beam squinting) at other frequencies. Communications performance at these other frequencies within the ultra-wide bandwidth may thus be constrained by the configuration of the array, as well as a number of RF chains, of the device, among other examples.

To avoid beamforming loss over an ultra-wide bandwidth, and as described herein, a wireless device may identify one or more default operating frequencies within an ultra-wide bandwidth and transmit an indication of the default operating frequencies to one or more other wireless devices. The default operating frequencies may be device-specific and may be based on a hardware configuration (e.g., a number of RF chains, antenna element spacing) for communications over the ultra-wide bandwidth. As an example, a first wireless device may indicate, to a second wireless device, a first default operating frequency based on an antenna configuration of the first wireless device. The second wireless device may use the indication of the default operating frequency to modify or adjust one or more communications parameters. The devices may then communicate over the bandwidth based on the one or more default operating frequencies. In some examples, the first device may identify and indicate multiple default operating frequencies (e.g., based on multiple RF chains of the first device).

The default operating frequency of one or more devices may enable the wireless devices to determine communications performance at other frequencies within the ultra-wide bandwidth and to adjust communications parameters accordingly. For example, the second device may operate at a frequency different from a first default operating frequency of the first device, which may result in beamforming loss during communications between the two devices. However, based on the indication of the first default operating frequency, the second device may instead select a different frequency band or channel over which to communicate. In other examples, the second device may modify beamforming parameters of an analog beamforming codebook based on the indication of the first default operating frequency. In some other examples, a range or upper and lower bounds of a default operating frequency may be indicated, and the devices may adjust one or more communications parameters based on the upper and lower bounds. Here, the upper and lower bounds may indicate the frequencies at which communications performance may be achieved in accordance with some performance threshold (e.g., based on a predetermined signal strength threshold for transmissions within the bounds). Selecting and/or adjusting parameters based on the one or more default operating frequencies may provide for more efficient communications between devices, and may reduce array gain deterioration due to beam shape distortion. Likewise, the enhanced communications performance obtained through sharing default operating frequencies may provide for relatively increased throughput and higher reliability, thereby enhancing user experience.

In some examples, the wireless device may store system information including a parameter that provides a mapping of nearby cells that have a similar hardware configuration. In some cases, the parameter may be a system information block (SIB) parameter (e.g., areaScopeFrequency) and may be processed similar to other SIB parameters (e.g., an areaScope parameter or other parameter). When the wireless device connects or reconnects to one of the cells indicated by the parameter, the wireless device may compare the stored system information to system information received from the cell. If the stored system information is the same as the system information received from the cell, the device may be aware of the default operating frequencies and/or antenna configuration(s) that may be used in that cell (e.g., because they may be similar to the default operating frequencies of the wireless device). The device may then communicate with one or more other wireless devices in the cell.

Aspects of the disclosure are initially described in the context of wireless communications systems. Aspects of the disclosure are then illustrated by a process flow. Aspects of the disclosure are further illustrated by and described with reference to apparatus diagrams, system diagrams, and flowcharts that relate to techniques for declaring default operating frequencies.

FIG. 1 illustrates an example of a wireless communications system 100 that supports techniques for declaring default operating frequencies in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. Devices in wireless communications system 100 may communicate over unlicensed spectrum, such as the 5 GHz band, the 2.4 GHz band, the 60 GHz band, the 3.6 GHz band, and/or the 900 MHz band. The unlicensed spectrum may also include other frequency bands. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, one or more UEs 115 and base stations 105 may communicate in an ultra-wide bandwidth (e.g., a 14 GHz bandwidth, a 25 GHz bandwidth, or some bandwidth that is greater than 3 GHz). However, a UE 115 may be configured (e.g., with a hardware/antenna configuration) to operate optimally at a subset of frequencies within the ultra-wide bandwidth, and may suffer reduced performance when communicating at other frequencies. The UE 115 may thus identify one or more default operating frequencies for communicating within the bandwidth and may transmit an indication of the one or more default operating frequencies to a base station 105 or other device in the wireless communications system 100. The indication may be transmitted via RRC signaling, control signaling, or the like. The base station 105 may configure one or more communications parameters according to the default operating frequencies, and the UE 115 and base station 105 may communicate over the ultra-wide bandwidth based on the default operating frequencies and configured communications parameters.

In some examples, a UE 115 may receive, from a base station 105, a system information (e.g., an SIB) that includes a parameter (e.g., areaScopeFrequency) indicating a mapping for a set of one or more cells. The cells may, for example, be geographically nearby the UE 115, and each cell may have at least one antenna array configuration that is the same (or within a threshold inter-antenna element spacing) as the antenna array configuration of the UE 115. That is, the parameter may indicate nearby cells that may have a similar default operating frequency (e.g., because the default operating frequency is based on the antenna array configuration) as the UE 115. The UE 115 may identify and store the system information. Upon connecting to a cell, the UE 115 may receive system information from the cell, and may compare the received system information with the stored system information. The UE 115 may then communicate with other wireless devices in the cell according to the comparison. For example, if the received system information is the same as the stored system information, other wireless devices in the cell may operate on default operating frequencies similar to the default operating frequency of the UE 115.

Figure 2:
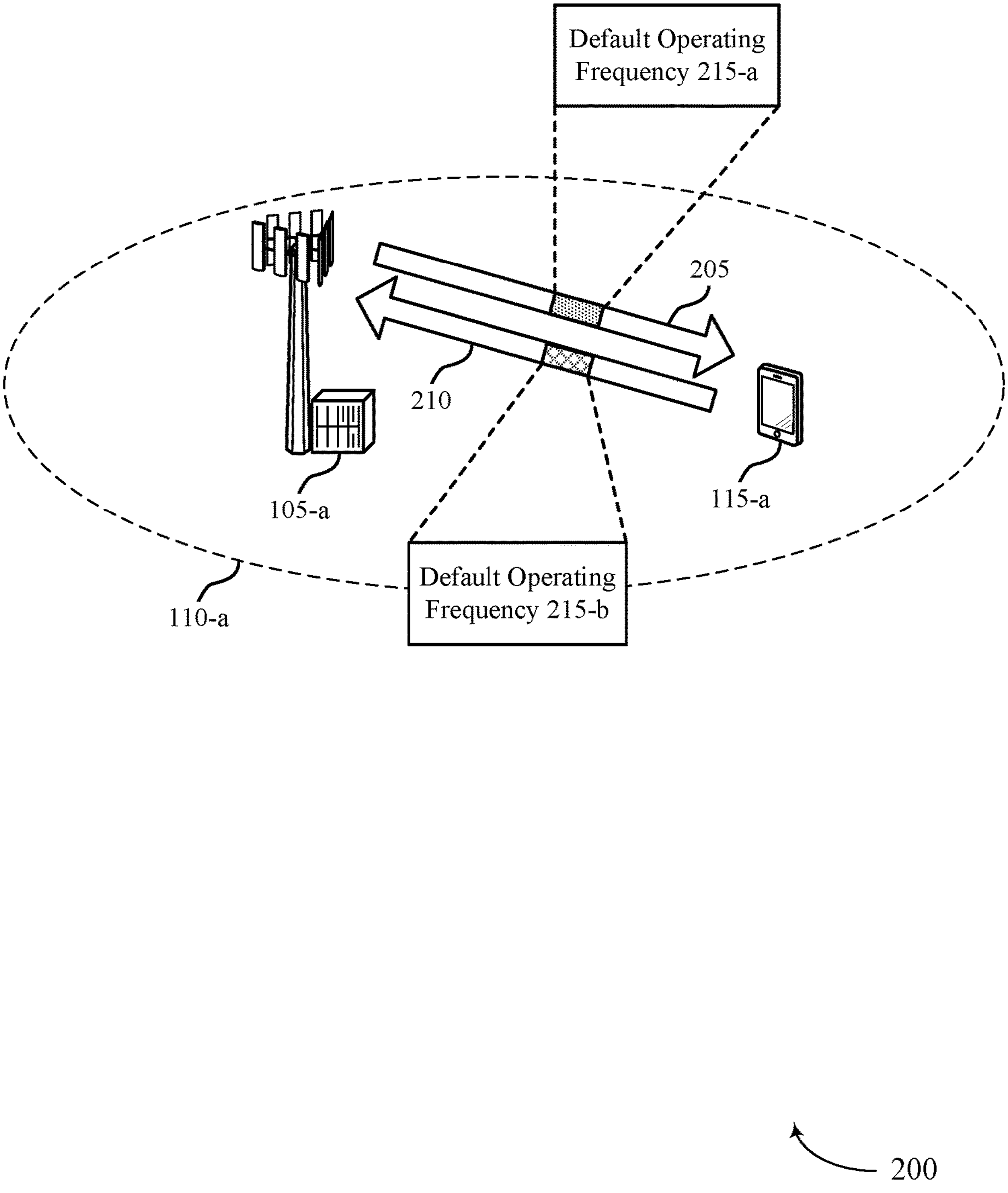
FIG. 2 illustrates an example of a wireless communications system that supports techniques for declaring default operating frequencies in accordance with aspects of the present disclosure.

FIG. 2 illustrates an example of a wireless communications system 200 that supports techniques for declaring default operating frequencies in accordance with aspects of the present disclosure. In some examples, wireless communications system 200 may implement aspects of wireless communications system 100. For example, the wireless communications system 200 includes a UE 115-*a* and a base station 105-*a*, which may be examples of a UE 115 and base station 105, respectively, described with reference to FIG. 1. It is to be understood that references to specific wireless devices (e.g., UEs or base stations) in the below figures are provided for illustrative purposes, and different wireless devices not specifically referred to herein may be used interchangeably with those described herein. Likewise, the described operations performed by a UE may, in some cases, be performed by a base station, and vice versa.

The base station 105-*a* may communicate with the UE 115-*a* via a downlink communication link 205 and an uplink communication link 210. In some examples, the base station 105-*a* and the UE 115-*a* may communicate over an ultra-wide bandwidth (e.g., 14 GHz, 25 GHz). The base station 105-*a* and UE 115-*a*, respectively, may identify one or more default operating frequencies 215-*a* and 215-*b* for communicating in the ultra-wide bandwidth. The default operating frequencies 215 may be predetermined by a hardware configuration of the corresponding device. For example, the UE 115-*a* may include hardware configured to perform beamforming with a limited number of RF chains over an antenna array. The antenna array may include a fixed inter-antenna element spacing for operation at a default operating frequency 215-*b* (e.g., 63 GHz).

The UE 115-*a* may transmit an indication of one or more default operating frequencies 215-*b* via uplink communication link 210. Additionally or alternatively, the base station 105-*a* may transmit, via communication link 205, an indication of one or more default operating frequencies 215-*a* of the base station 105-*a*. The default operating frequencies may be indicated via capability signaling (e.g., via RRC signaling). In other examples, the default operating frequencies may be dynamically indicated (e.g., using DCI, SCI, or the like), which may be based on changes in interference measured at a default operating frequency. As an example, communications performance at a first default operating frequency may change (e.g., degrade), and the UE 115-*a* or the base station 105-*a* may select a second, different default operating frequency to communicate with, where the second default operating frequency may be dynamically signaled between the devices. The base station 105-*a* may identify the antenna array configuration of the UE 115-*a* or one or more carrier frequencies corresponding to an analog beamforming codebook of the UE 115-*b* based on the default operating frequency 215-*b*.

The UE 115-*a*, the base station 105-*a*, or both, may adjust communications parameters (e.g., for communicating over communication links 205 and 210) based on the default operating frequencies 215. As an example, the base station 105-*a* may configure, adjust, or modify communications parameters to provide optimal performance for the UE 115-*a* and the base station 105-*a* based on the default operating frequency 215-*b*. That is, transmissions to/from the UE 115-*a* may meet a predetermined performance threshold at the default operating frequency 215-*b* and may suffer array gain and/or beamforming loss (e.g., due to beam shape distortion) at other frequencies within the bandwidth; accordingly, the base station 105-*a* may select communications parameters that avoid such loss, while maintaining performance at the base station 105-*a*. For example, the base station 105-*a* may select a frequency band (e.g., an RF spectrum band) or channel for communication based that is relatively near (e.g., in the frequency domain) or includes the default operating frequency 215-*b*. In other examples, the base station 105-*a* and UE 115-*a* may determine that the default operating frequency 215-*a* and the default operating frequency 215-*b* satisfy a threshold difference (e.g., a predetermined threshold difference), and may choose to communicate in a third default operating frequency (e.g., different than the default operating frequencies 215-*a* and 215-*b*). Put another way, if the default operating frequencies are different from each other (e.g., based on some predetermined threshold), another, different operating frequency may be selected to achieve communications performance (e.g., based on a signal strength threshold) between the devices. Other communications parameters may include, but are not limited to, beamforming parameters of an analog beamforming codebook associated with an antenna array of the UE 115-*a*. In any case, the base station 105-*a* and the UE 115-*a* may communicate over the ultra-wide bandwidth according to the default operating frequencies 215.

In some cases, the default operating frequencies 215 may be dynamically indicated and may be changed or updated based on communications performance. For example, the default operating frequency 215-*b* may indicate performance metrics for a set of frequencies over the bandwidth, and the base station 105-*a* may estimate analog beamforming performance associated with communications in the corresponding set of frequencies. The base station 105-*a* may then update or adjust communications parameters based on the estimated beamforming performance. As another example, the UE 115-*a* and base station 105-*a* may operate, based on a first default operating frequency 215, within a 2 GHz band (e.g., 63 GHz-65 GHz) of the ultra-wide bandwidth. The performance within the 2 GHz band may degrade over time or may fail to meet a performance threshold. Accordingly, the base station 105-*a* and/or the UE 115-*a* may transmit an indication of a second default operating frequency 215 and may adjust communications parameters accordingly (e.g., may switch to a different 2 GHz band, such as 57 GHz-59 GHz). In some cases, the second default operating frequency 215 may be one of a set of default operating frequencies. Additionally or alternatively, the indication of the default operating frequency 215 may include upper and lower frequency boundaries such that operating frequencies within (e.g., up to and/or including) the boundaries satisfy a predetermined performance threshold (e.g., a predetermined signal strength threshold), and the base station 105-*a* and UE 115-*a* may communicate over one or more frequencies within the frequency boundaries.

In some examples, the UE 115-*a* or the base station 105-*a* may receive system information (e.g., a system information block (SIB)) that includes a parameter (e.g., an areaScope-Frequency parameter, which may be processed similar to other SIB parameters such as an areaScope parameter or other parameter) indicating a mapping for a set of one or more cells, where each cell of the set of cells may operate using an antenna array configuration that is the same as the antenna array configuration used by the device that received the system information. For example, the UE 115-*a* may receive a system information including the parameter from the base station 105-*a* and may store the system information. The UE 115-*a* may connect with a cell of the set of cells and may receive a second system information from the cell. The UE 115-*a* may compare the stored system information with the system information received from the cell, and may communicate with other wireless devices associated with the cell based on the comparison. For instance, the UE 115-*a* may determine that the stored system information matches the system information received from the cell. Thus, other wireless devices associated with the cell (e.g., including a base station providing the cell) may operate using an antenna array configuration similar to that of the UE 115-*a* and, consequently, a default operating frequency similar to the default operating frequency 215-*b*. The UE 115-*a* may be aware of a compatibility with the other wireless devices in the cell, and may communicate via the same or a similar default operating frequency.

Figure 3:
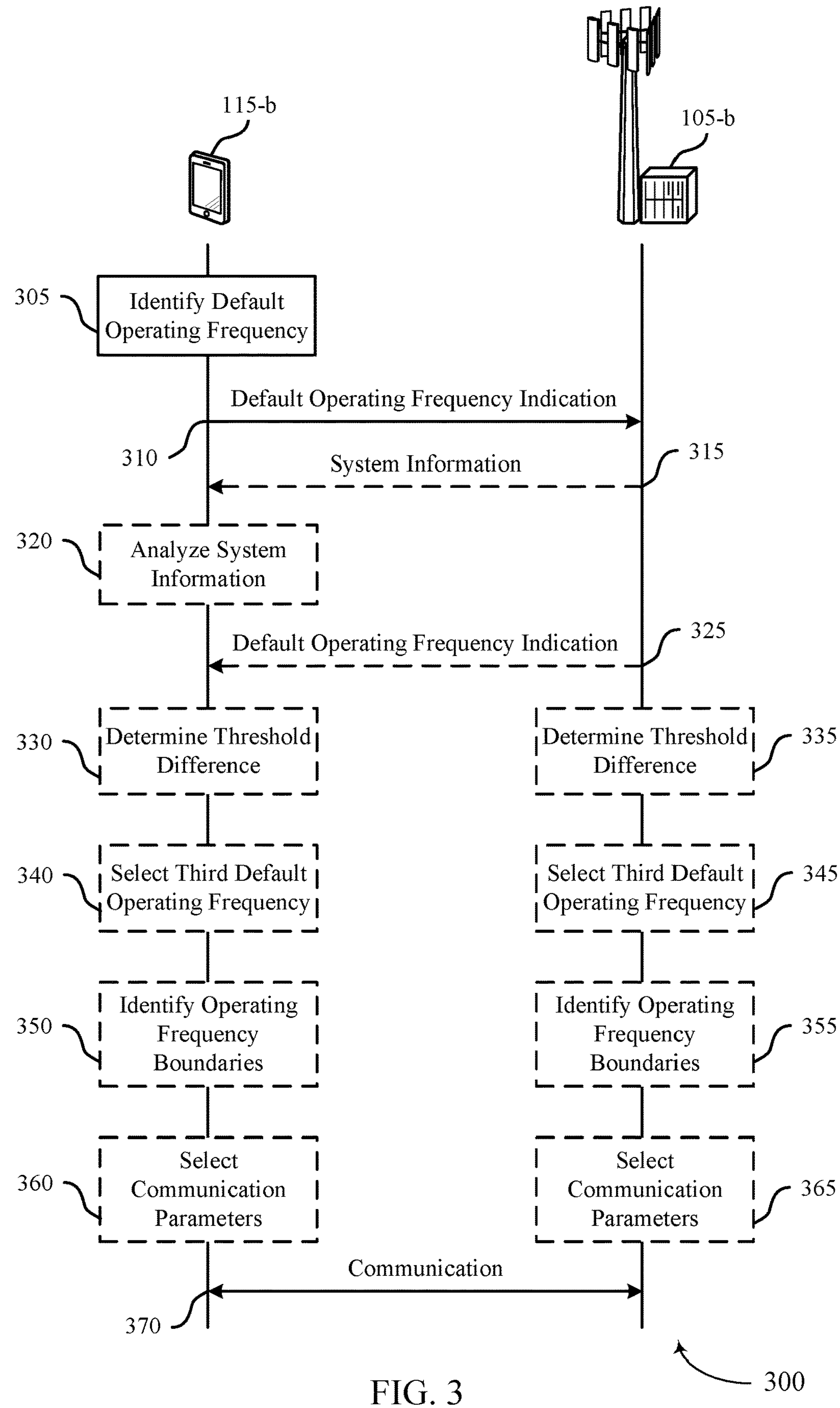
FIG. 3 illustrates an example of a process flow that supports techniques for declaring default operating frequencies in accordance with aspects of the present disclosure.

FIG. 3 illustrates an example of a process flow 300 that supports techniques for declaring default operating frequencies in accordance with aspects of the present disclosure. In some examples, process flow 300 may implement aspects of wireless communications systems 100 and 200. For example, the process flow 300 includes a UE 115-*b* and a base station 105-*b* that each may be examples of the corresponding devices described with reference to FIGS. 1 and 2. The process flow 300 may illustrate an example of the base station 105-*b* and UE 115-*b* determining and signaling one or more default operating frequencies to be used for communications between the UE 115-*b* and the base station 105-*b*.

In the following description of the process flow 300, the operations between UE 115-*b* and base station 105-*b* may be transmitted in a different order than the order shown, or the operations performed by base station 105-*b* and UE 115-*b* may be performed in different orders or at different times. Certain operations may also be left out of the process flow 300, or other operations may be added to the process flow 300. It is to be understood that while base station 105-*b* and UE 115-*b* are shown performing a number of the operations of process flow 300, any wireless device (e.g., a UE, a customer premises equipment (CPE), a base station, an IAB node, a repeater, or a sidelink node, among other examples) may perform the operations shown.

At 305, the UE 115-*b* may identify a default operating frequency for communicating over a bandwidth. The default operating frequency may be specific to the UE 115-*b*, and may be predetermined by an antenna array configuration (e.g., a number of RF chains) of the UE 115-*b*. In some cases, the default operating frequency may indicate the antenna array configuration of UE 115-*b*. The antenna array configuration may include an inter-antenna element spacing of an antenna array having uniformly-spaced antenna elements or non-uniformly spaced antenna elements. In some examples, the default operating frequency may indicate performance metrics for a set of frequencies over the bandwidth.

At 310, the UE 115-*b* may transmit, to the base station 105-*b*, a message including an indication of the default operating frequency. In some cases, the UE 115-*b* may identify (e.g., at 305) and transmit an indication of multiple default operating frequencies. The message may be a capability message (e.g., an RRC message), control information, or the like. In cases where the default operating frequency includes performance metrics for a set of frequencies over the bandwidth, the base station 105-*b* may estimate analog beamforming performance for the set of frequencies.

At 315, the base station 105-*b* may optionally transmit an indication of system information to the UE 115-*b*. The system information may include a parameter indicating a mapping for a set of one or more cells that may operate using at least one antenna array configuration that is the same as the antenna array configuration of the UE 115-*b*. The UE 115-*b* may store the system information, including the parameter.

At 320, the UE 115-*b* may analyze the stored system information. For instance, the UE 115-*b* may compare the stored system information with a second system information received from a cell of the set of one or more cells, and the UE 115-*b* may determine default operating frequencies that may be used in the cell.

At 325, the base station 105-*b* may optionally transmit a message including an indication of a default operating frequency for the base station 105-*b*. The default operating frequency for the base station 105-*b* may be determined by an antenna configuration of the base station 105-*b*, a frequency band from a set of frequency bands, a channel from a set of channels, one or more carrier frequencies associated with an analog beamforming codebook of the base station 105-*b*, or some combination thereof. The UE 115-*b* may receive the indication and determine the default operating frequency for the base station 105-*b*.

At 330 and 335, the UE 115-*b* and base station 105-*b*, respectively, may each determine that the first default operating frequency (e.g., of the UE 115-*b*) and the second default operating frequency (e.g., of the base station 105-*b*) satisfy a threshold difference. That is, the default operating frequency of the UE 115-*b* may be different from the default operating frequency of the base station 105-*b* such that the difference (e.g., in the frequency domain) may be unable to provide efficient communications.

As such, at 340 and 345, the UE 115-*b* and base station 105-*b*, respectively, may each optionally select a third default operating frequency (e.g., different than the first and second default operating frequencies) based on the threshold difference determined at 330 or 335. For example, at 340, the UE 115-*b* may select a third default operating frequency different from the first default operating frequency, and at 345, the base station 105-*b* may select the third default operating frequency different from the second default operating frequency.

At 350 and 355, the UE 115-*b* and base station 105-*b*, respectively, may each identify boundaries for one or more default operating frequencies. For example, at 350, the UE 115-*b* may identify a first operating frequency boundary (e.g., an upper frequency boundary) and a second operating frequency boundary (e.g., a lower frequency boundary) for the default operating frequency. In some examples, the upper and lower frequency boundaries may be indicated by the respective devices (e.g., at 310 or 325) as part of a capability message, or part of DCI, SCI, or other signaling. The operating frequencies within the first and second operating frequency boundaries (which may include the frequency boundaries) may provide beamforming performance that satisfies a threshold. The threshold may be a performance threshold, which may be based on a signal strength threshold for communications over the operating frequencies. In some cases, the UE 115-*b* may include an indication of the first and second operating frequency boundaries with the default operating frequency indication transmitted at 310. In such cases, at 355, the base station 105-*b* may identify the first and second operating frequency boundaries for the default operating frequency of the UE 115-*b* based on the indication.

At 360 and 365, the UE 115-*b* and base station 105-*b*, respectively, may each select communications parameters based on the default operating frequencies of the UE 115-*b*, the base station 105-*b*, or both. For example, at 360, the UE 115-*b* may select beamforming parameters of the analog beamforming codebook associated with an antenna array of the UE 115-*b*. Additionally or alternatively, the UE 115-*b* may select a frequency band, channel, or both. At 365, the base station 105-*b* may identify the antenna configuration of the UE 115-*b*, one or more carrier frequencies or other analog beamforming parameters corresponding to an analog beamforming codebook of the UE 115-*b*, a frequency band from a set of frequency bands, a channel from a set of channels, or some combination thereof, and may select one or more communications parameters accordingly.

At 370, the base station 105-*b* and the UE 115-*b* may communicate based on the default operating frequencies indicated at 310. In some cases, the communication may also be based on the comparison of system information at 320, the one or more default operating frequencies indicated at 325, the threshold difference determined at 330 or 335, the third default operating frequency determined at 340 or 345, the frequency boundaries identified at 350 or 355, the communications parameters determined at 360 or 365, or some combination thereof.

Figure 4:
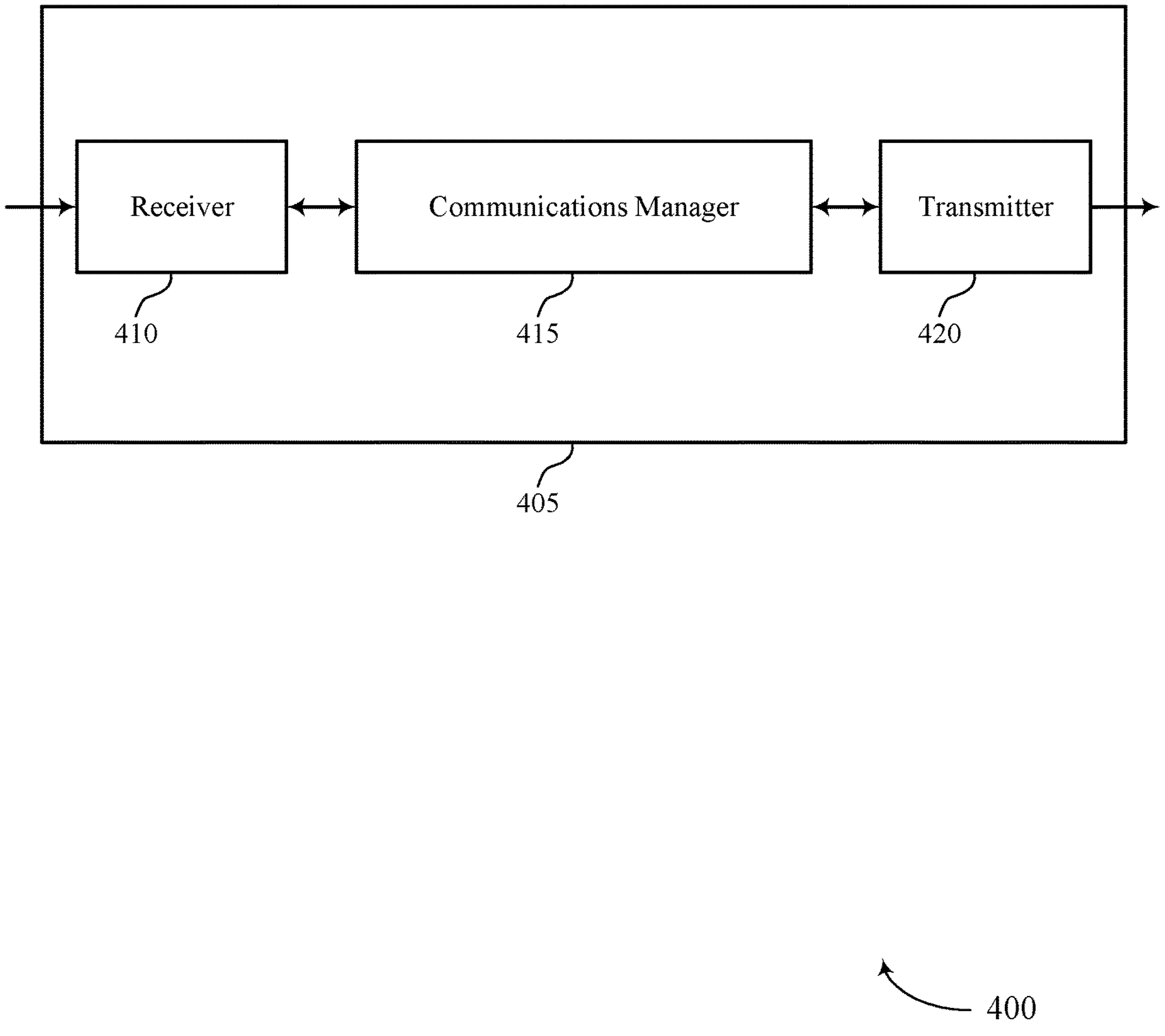
FIGS. 4 and 5 show block diagrams of devices that support techniques for declaring default operating frequencies in accordance with aspects of the present disclosure.

FIG. 4 shows a block diagram 400 of a device 405 that supports techniques for declaring default operating frequencies in accordance with aspects of the present disclosure. The device 405 may be an example of aspects of a UE 115 or base station 105 as described herein. In other examples, the device 405 may be an example of aspects of a CPE, or an IAB node, or a repeater, or a sidelink node, or another device in a wireless network, as described herein. The device 405 may include a receiver 410, a communications manager 415, and a transmitter 420. The device 405 may also include one or more processors, memory coupled with the one or more processors, and instructions stored in the memory that are executable by the one or more processors to enable the one or more processors to perform the frequency declaration features discussed herein. Each of these components may be in communication with one another (e.g., via one or more buses).

Receiver 410 may receive information such as packets, user data, or control information associated with various information channels (e.g., control channels, data channels, and information related to techniques for declaring default operating frequencies, etc.). Information may be passed on to other components of the device 405. The receiver 410 may be an example of aspects of the transceiver 720 or 820 as described with reference to FIGS. 7 and 8. The receiver 410 may utilize a single antenna or a set of antennas.

The communications manager 415 may identify one or more default operating frequencies for communicating over a bandwidth, each default operating frequency of the one or more default operating frequencies being predetermined by an antenna array configuration of the first wireless device, transmit, to a second wireless device, a message including an indication of the one or more default operating frequencies of the first wireless device, and communicate with the second wireless device over the bandwidth based on the one or more default operating frequencies.

The communications manager 415 may also receive, from a second wireless device, a message including an indication of one or more default operating frequencies of the second wireless device, the one or more default operating frequencies for communicating over a bandwidth based on an antenna array configuration of the second wireless device, configure one or more communications parameters based on one or more default operating frequencies of the first wireless device and the one or more default operating frequencies of the second wireless device, and communicate with the second wireless device over the bandwidth based on the one or more communications parameters. The communications manager 415 may be an example of aspects of the communications manager 710 or 810 as described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

By including or configuring the communications manager 415 in accordance with examples as described herein, the device 405 (e.g., a processor controlling or otherwise coupled to the receiver 410, the transmitter 420, the communications manager 415, or a combination thereof) may support techniques for communicating with another wireless device based on default operating frequencies, which may reduce gain and beamforming loss at the device 405. For example, the device 405 and/or the other device may adjust one or more communications parameters based on corresponding indications of default operating frequencies, thereby reducing beamforming loss, beam shape distortion, and array gain deterioration at the device 405. Additionally, reducing such loss at the device 405 may increase communications efficiency and reliability between the device 405 and the other device.

Transmitter 420 may transmit signals generated by other components of the device 405. In some examples, the transmitter 420 may be collocated with a receiver 410 in a transceiver module. For example, the transmitter 420 may be an example of aspects of the transceiver 720 or 820 as described with reference to FIGS. 7 and 8. The transmitter 420 may utilize a single antenna or a set of antennas.

Figure 5:
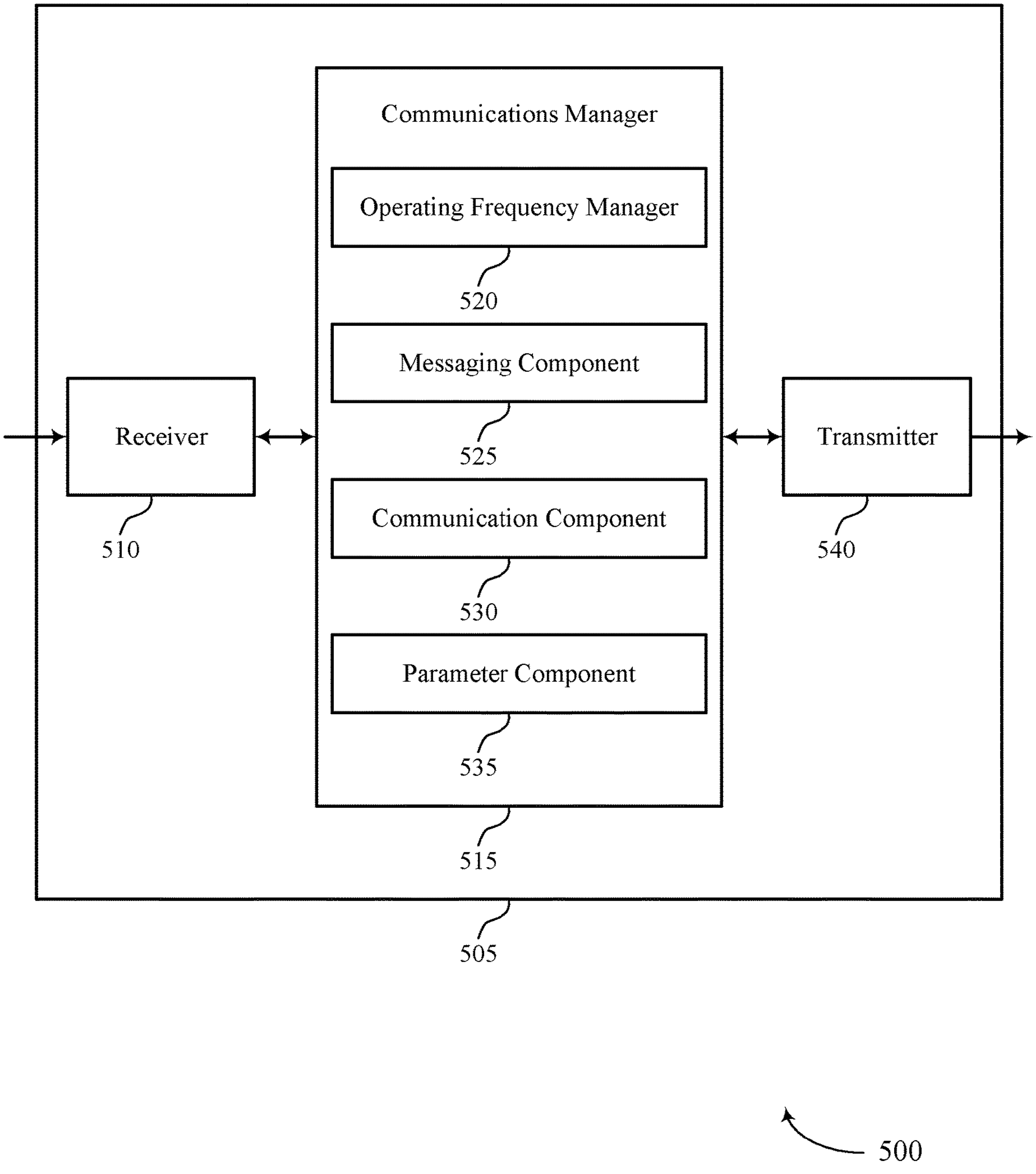

FIG. 5 shows a block diagram 500 of a device 505 that supports techniques for declaring default operating frequencies in accordance with aspects of the present disclosure. The device 505 may be an example of aspects of a device 405, a UE 115, or a base station 105 as described herein. In other examples, the device 505 may be an example of aspects of a CPE, or an IAB node, or a repeater, or a sidelink node, or another device in a wireless network, as described herein. The device 505 may include a receiver 510, a communications manager 515, and a transmitter 540. The device 505 may also include a processor. Each of these components may be in communication with one another (e.g., via one or more buses).

Receiver 510 may receive information such as packets, user data, or control information associated with various information channels (e.g., control channels, data channels, and information related to techniques for declaring default operating frequencies, etc.). Information may be passed on to other components of the device 505. The receiver 510 may be an example of aspects of the transceiver 720 or 820 as described with reference to FIGS. 7 and 8. The receiver 510 may utilize a single antenna or a set of antennas.

The communications manager 515 may be an example of aspects of the communications manager 415 as described herein. The communications manager 515 may include an operating frequency manager 520, a messaging component 525, a communication component 530, and a parameter component 535. The communications manager 515 may be an example of aspects of the communications manager 710 or 810 as described herein.

The operating frequency manager 520 may identify, by the first wireless device, one or more default operating frequencies for communicating over a bandwidth, each default operating frequency of the one or more default operating frequencies being predetermined by an antenna array configuration of the first wireless device.

The messaging component 525 may transmit, to a second wireless device, a message including an indication of the one or more default operating frequencies of the first wireless device. The messaging component 525 may receive, from a second wireless device, a message including an indication of one or more default operating frequencies of the second wireless device, the one or more default operating frequencies for communicating over a bandwidth based on an antenna array configuration of the second wireless device.

The communication component 530 may communicate with the second wireless device over the bandwidth based on the one or more default operating frequencies.

The parameter component 535 may configure one or more communications parameters based on one or more default operating frequencies of the first wireless device and the one or more default operating frequencies of the second wireless device.

The communication component 530 may communicate with the second wireless device over the bandwidth based on the one or more communications parameters.

Transmitter 540 may transmit signals generated by other components of the device 505. In some examples, the transmitter 540 may be collocated with a receiver 510 in a transceiver module. For example, the transmitter 540 may be an example of aspects of the transceiver 720 or 820 as described with reference to FIGS. 7 and 8. The transmitter 540 may utilize a single antenna or a set of antennas.

In some cases, the operating frequency manager 520, messaging component 525, communication component 530, and parameter component 535 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the operating frequency manager 520, messaging component 525, communication component 530, and parameter component 535 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 6:
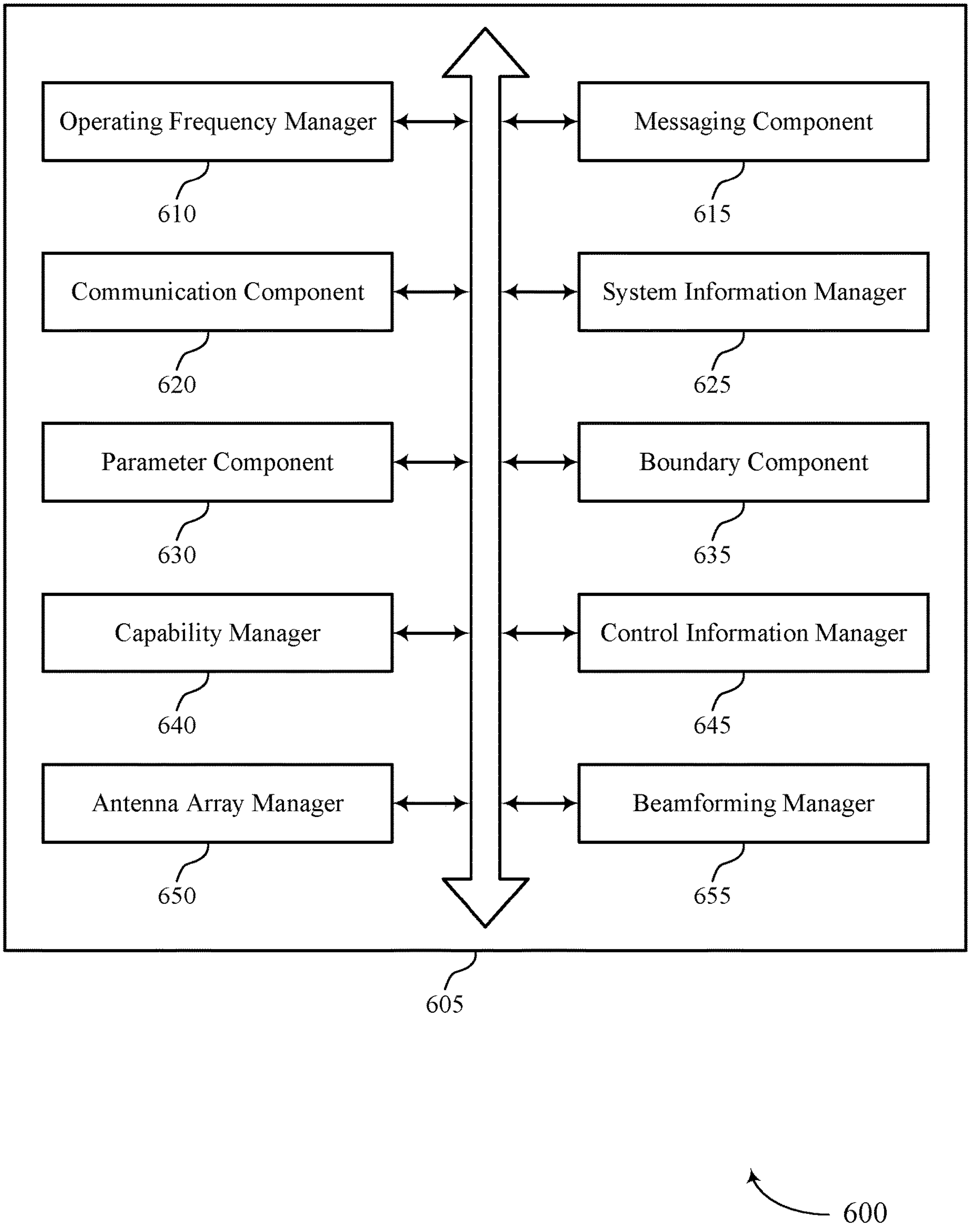
FIG. 6 shows a block diagram of a communications manager that supports techniques for declaring default operating frequencies in accordance with aspects of the present disclosure.

FIG. 6 shows a block diagram 600 of a communications manager 605 that supports techniques for declaring default operating frequencies in accordance with aspects of the present disclosure. The communications manager 605 may be an example of aspects of a communications manager 415, a communications manager 515, or a communications manager 710 described herein. The communications manager 605 may include an operating frequency manager 610, a messaging component 615, a communication component 620, a system information manager 625, a parameter component 630, a boundary component 635, a capability manager 640, a control information manager 645, an antenna array manager 650, and a beamforming manager 655. Each of these modules may communicate, directly or indirectly, with one another (e.g., via one or more buses).

The operating frequency manager 610 may identify, by the first wireless device, one or more default operating frequencies for communicating over a bandwidth, each default operating frequency of the one or more default operating frequencies being predetermined by an antenna array configuration of the first wireless device.

In some examples, the operating frequency manager 610 may determine the one or more default operating frequencies of the second wireless device based on the second message, where the one or more default operating frequencies of the second wireless device may be determined by at least an antenna configuration of the second wireless device, or one or more carrier frequencies associated with an analog beamforming codebook of the second wireless device, or a frequency band from a set of frequency bands, or a channel from a set of channels, or any combination thereof.

In some examples, the operating frequency manager 610 may determine that a first default operating frequency of the first wireless device and a second default operating frequency of the second wireless device satisfy a predetermined threshold difference. In some cases, the operating frequency manager 610 may select a third default operating frequency of the first wireless device based on the determination, the third default operating frequency being different from the first default operating frequency, where communicating with the second wireless device over the bandwidth is based on the third default operating frequency.

In some examples, the operating frequency manager 610 may determine that a first default operating frequency of the first wireless device and a second default operating frequency of the second wireless device satisfy a predetermined threshold difference. In some aspects, the operating frequency manager 610 may select a third default operating frequency of the first wireless device based on the determination, the third default operating frequency being different from the first default operating frequency, where communicating with the second wireless device within the bandwidth is based on the third default operating frequency.

In some cases, the antenna array configuration includes a number of RF chains associated with an antenna array of the first wireless device. In some examples, the one or more default operating frequencies are specific to the first wireless device. In some cases, the first wireless device or the second wireless device, or both, includes a user equipment, or a CPE, or a base station, or an IAB node, or a wireless repeater, or a sidelink node.

In some cases, the one or more default operating frequencies of the second wireless device indicate an antenna array configuration of the second wireless device, the antenna array configuration including an inter-antenna element spacing of an antenna array having uniformly-spaced antenna elements or a non-uniformly-spaced antenna elements.

The messaging component 615 may transmit, to a second wireless device, a message including an indication of the one or more default operating frequencies of the first wireless device. In some examples, the messaging component 615 may receive, from a second wireless device, a message including an indication of one or more default operating frequencies of the second wireless device, the one or more default operating frequencies for communicating over a bandwidth based on an antenna array configuration of the second wireless device. In some examples, the messaging component 615 may receive, from the second wireless device, a second message including an indication of one or more default operating frequencies of the second wireless device.

In some cases, the one or more default operating frequencies of the first wireless device indicate performance metrics for a set of frequencies over the bandwidth. In some aspects, the one or more default operating frequencies of the first wireless device indicate the antenna array configuration of the first wireless device, the antenna array configuration including an inter-antenna element spacing of an antenna array having uniformly-spaced antenna elements or a non-uniformly-spaced antenna elements.

The communication component 620 may communicate with the second wireless device over the bandwidth based on the one or more default operating frequencies. In some examples, the communication component 620 may communicate with the second wireless device over the bandwidth based on the one or more communications parameters. In some cases, the communication component 620 may communicate with one or more wireless devices associated with the first cell using the one or more default operating frequencies based on the comparison.

In some examples, the communication component 620 may select at least the frequency band, or the channel, or any combination thereof, for communicating with the second wireless device based on the one or more default operating frequencies of the first wireless device and the one or more default operating frequencies of the second wireless device, where communicating with the second wireless device over the bandwidth is based on the selected frequency band, or the channel, or any combination thereof.

In some examples, the communication component 620 may identify, based on the one or more default operating frequencies, at least a frequency band from a set of frequency bands, or a channel from a set of channels, or any combination thereof.

The parameter component 630 may configure one or more communications parameters based on one or more default operating frequencies of the first wireless device and the one or more default operating frequencies of the second wireless device. In some examples, the parameter component 630 may select one or more communications parameters based on the one or more default operating frequencies of the first wireless device and the one or more default operating frequencies of the second wireless device, where communicating with the second wireless device over the bandwidth is based on the selected one or more communications parameters. In some cases, the parameter component 630 may select the one or more communications parameters based on the antenna array configuration of the second wireless device, the one or more carrier frequencies, or any combination thereof.

In some examples, the parameter component 630 may select the one or more communications parameters based on the frequency band, or the channel, or any combination thereof. In some cases, the one or more communications parameters include beamforming parameters of the analog beamforming codebook associated with an antenna array of the first wireless device. In some cases, the one or more communications parameters include analog beamforming parameters of an analog beamforming codebook associated with an antenna array of the second wireless device.

The system information manager 625 may receive a first system information including a parameter that indicates a mapping for a set of one or more cells, where each cell of the set of one or more cells operates using at least one antenna array configuration that is the same as the antenna array configuration as the first wireless device. In some examples, the system information manager 625 may store the first system information including the parameter. In some examples, the system information manager 625 may compare the stored first system information with a second system information received from a first cell of the set of one or more cells.

In some examples, the system information manager 625 may transmit system information including a parameter that indicates a mapping for a set of one or more cells, where each cell of the set of one or more cells operates using at least one antenna array configuration that is the same as an antenna array configuration of the second wireless device.

The boundary component 635 may identify a first operating frequency boundary and a second operating frequency boundary for each default operating frequency of the one or more default operating frequencies, the first operating frequency boundary being different from the second operating frequency boundary, where the indication of the one or more default operating frequencies includes an indication of at least the first operating frequency boundary, or the second operating frequency boundary, or any combination thereof.

In some examples, the boundary component 635 may identify, from the indication of the one or more default operating frequencies, a first operating frequency boundary and a second operating frequency boundary for the one or more default operating frequencies of the second wireless device, the first operating frequency boundary being different from the second operating frequency boundary, where communicating with the second wireless device over the bandwidth is based on the first operating frequency boundary, or the second operating frequency boundary, or any combination thereof.

In some cases, the first operating frequency boundary includes an upper frequency boundary and the second operating frequency boundary includes a lower frequency boundary, and where one or more operating frequencies within the upper frequency boundary and the lower frequency boundary provide beamforming performance that satisfies a performance threshold. In some examples, the performance threshold may be based on a signal strength threshold for communications over the one or more operating frequencies.

The capability manager 640 may transmit, to the second wireless device, a capability message including the indication of the one or more default operating frequencies of the first wireless device. In some examples, the capability manager 640 may receive, from the second wireless device, a capability message including the indication of the one or more default operating frequencies of the first wireless device.

The control information manager 645 may transmit, to the second wireless device, control information including the indication of the one or more default operating frequencies of the first wireless device. In some examples, the control information manager 645 may receive, from the second wireless device, control information including the indication of the one or more default operating frequencies of the first wireless device.

The antenna array manager 650 may identify, based on the one or more default operating frequencies, at least an antenna array configuration of the second wireless device, or one or more carrier frequencies corresponding to an analog beamforming codebook of the second wireless device, or any combination thereof.

The beamforming manager 655 may estimate analog beamforming performance for a set of frequencies over the bandwidth, where the one or more default operating frequencies of the second wireless device indicate performance metrics for the set of frequencies.

In some cases, the operating frequency manager 610, the messaging component 615, the communication component 620, the system information manager 625, the parameter component 630, the boundary component 635, the capability manager 640, the control information manager 645, the antenna array manager 650, and the beamforming manager 655 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the operating frequency manager 610, the messaging component 615, the communication component 620, the system information manager 625, the parameter component 630, the boundary component 635, the capability manager 640, the control information manager 645, the antenna array manager 650, and the beamforming manager 655 discussed herein.

Figure 7:
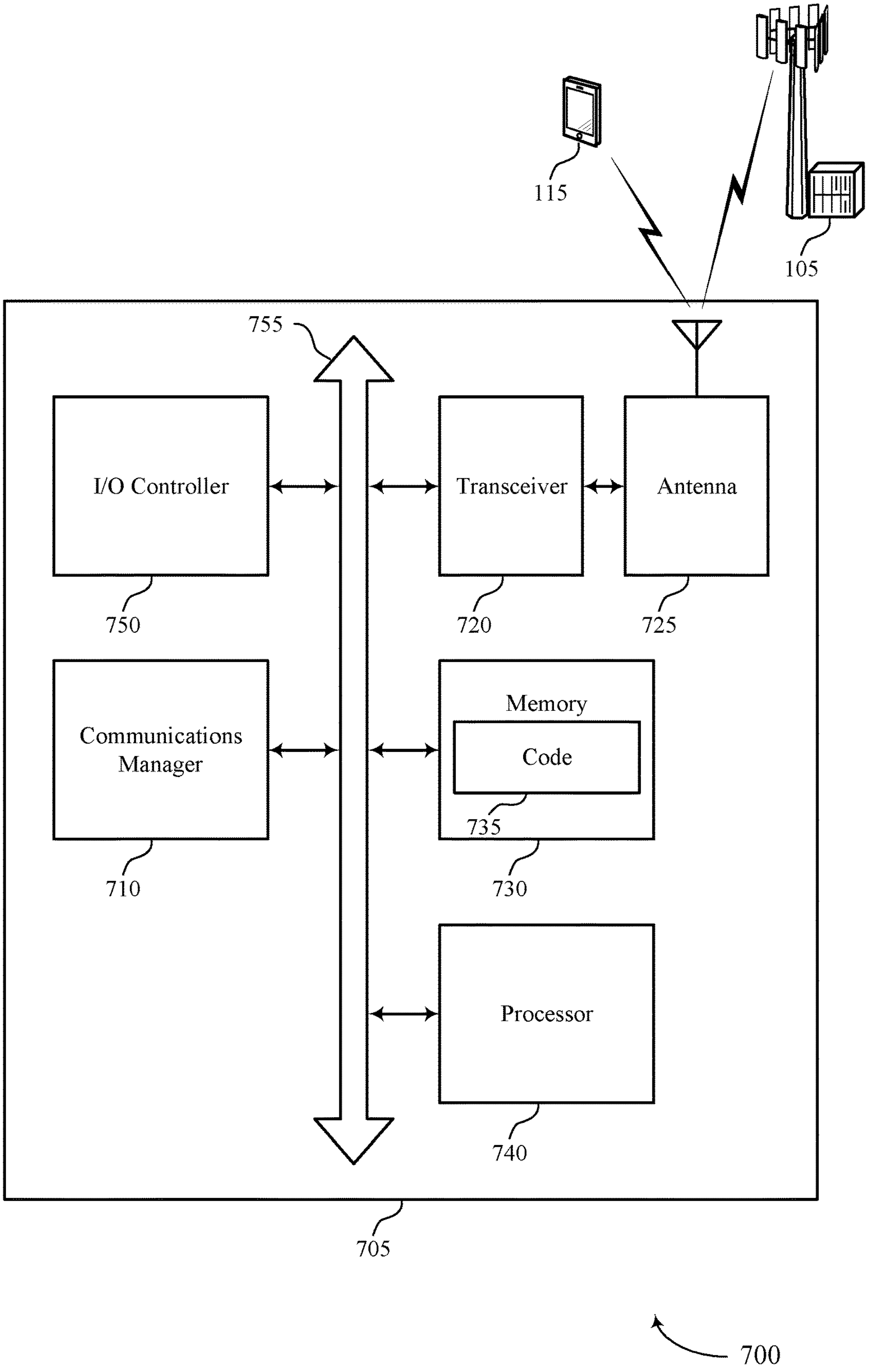
FIG. 7 shows a diagram of a system including a user equipment (UE) that supports techniques for declaring default operating frequencies in accordance with aspects of the present disclosure.

FIG. 7 shows a diagram of a system 700 including a device 705 that supports techniques for declaring default operating frequencies in accordance with aspects of the present disclosure. The device 705 may be an example of or include the components of device 405, device 505, or a UE 115 as described herein. In other examples, the device 705 may be an example of aspects of a CPE, or an IAB node, or a repeater, or a sidelink node, or another device in a wireless network, as described herein. The device 705 may include components for bi-directional voice and data communications including components for transmitting and receiving communications, including a communications manager 710, a transceiver 720, an antenna 725, memory 730, a processor 740, and an I/O controller 750. These components may be in electronic communication via one or more buses (e.g., bus 755).

The communications manager 710 may identify, by the first wireless device, one or more default operating frequencies for communicating over a bandwidth, each default operating frequency of the one or more default operating frequencies being predetermined by an antenna array configuration of the first wireless device, transmit, to a second wireless device, a message including an indication of the one or more default operating frequencies of the first wireless device, and communicate with the second wireless device over the bandwidth based on the one or more default operating frequencies. The communications manager 710 may also receive, from a second wireless device, a message including an indication of one or more default operating frequencies of the second wireless device, the one or more default operating frequencies for communicating over a bandwidth based on an antenna array configuration of the second wireless device, configure one or more communications parameters based on one or more default operating frequencies of the first wireless device and the one or more default operating frequencies of the second wireless device, and communicate with the second wireless device over the bandwidth based on the one or more communications parameters.

By including or configuring the communications manager 715 in accordance with examples as described herein, the device 705 may support techniques for communicating with another wireless device based on default operating frequencies, which may improve communications performance by reducing beamforming loss, beam shape distortion, and array gain deterioration at the device 705. Improving performance at the device 705 may further increase system throughput and reliability, as the likelihood of message failures and retransmissions may decrease. Additionally, reducing such loss at the device 705 and other devices with which the device 705 communicates may improve coordination between the devices, thereby enhancing communications efficiency.

Transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the wireless device may include a single antenna 725. However, in some cases the device may have more than one antenna 725, which may be capable of concurrently transmitting or receiving multiple wireless transmissions.

The memory 730 may include random-access memory (RAM), read-only memory (ROM), or a combination thereof. The memory 730 may store computer-readable code 735 including instructions that, when executed by a processor (e.g., the processor 740) cause the device to perform various functions described herein. In some cases, the memory 730 may contain, among other things, a basic input/output system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for declaring default operating frequencies).

The I/O controller 750 may manage input and output signals for the device 705. The I/O controller 750 may also manage peripherals not integrated into the device 705. In some cases, the I/O controller 750 may represent a physical connection or port to an external peripheral. In some cases, the I/O controller 750 may utilize an operating system such as iOS®, ANDROID®, MS-DOS®, MS-WINDOWS®, OS/2®, UNIX®, LINUX®, or another known operating system. In other cases, the I/O controller 750 may represent or interact with a modem, a keyboard, a mouse, a touchscreen, or a similar device. In some cases, the I/O controller 750 may be implemented as part of a processor. In some cases, a user may interact with the device 705 via the I/O controller 750 or via hardware components controlled by the I/O controller 750.

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
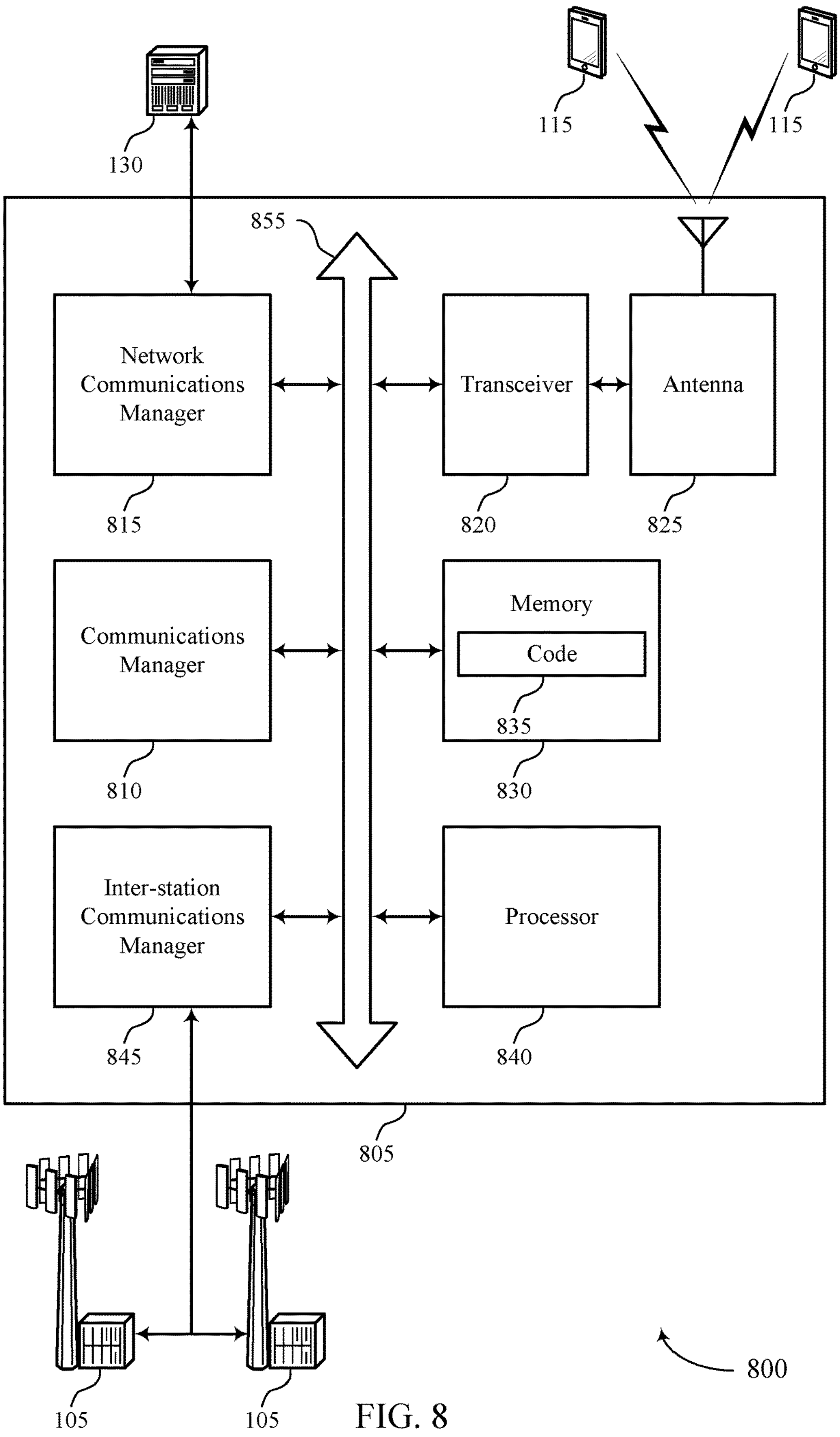
FIG. 8 shows a diagram of a system including a base station that supports techniques for declaring default operating frequencies in accordance with aspects of the present disclosure.

FIG. 8 shows a diagram of a system 800 including a device 805 that supports techniques for declaring default operating frequencies in accordance with aspects of the present disclosure. The device 805 may be an example of or include the components of device 405, device 505, or a base station 105 as described herein. In other examples, the device 805 may be an example of aspects of a CPE, or an IAB node, or a repeater, or a sidelink node, or another device in a wireless network, as described herein. The device 805 may include components for bi-directional voice and data communications including components for transmitting and receiving communications, including a communications manager 810, a network communications manager 815, a transceiver 820, an antenna 825, memory 830, a processor 840, and an inter-station communications manager 845. These components may be in electronic communication via one or more buses (e.g., bus 855).

The communications manager 810 may identify, by the first wireless device, one or more default operating frequencies for communicating over a bandwidth, each default operating frequency of the one or more default operating frequencies being predetermined by an antenna array configuration of the first wireless device, transmit, to a second wireless device, a message including an indication of the one or more default operating frequencies of the first wireless device, and communicate with the second wireless device over the bandwidth based on the one or more default operating frequencies. The communications manager 810 may also receive, from a second wireless device, a message including an indication of one or more default operating frequencies of the second wireless device, the one or more default operating frequencies for communicating over a bandwidth based on an antenna array configuration of the second wireless device, configure one or more communications parameters based on one or more default operating frequencies of the first wireless device and the one or more default operating frequencies of the second wireless device, and communicate with the second wireless device over the bandwidth based on the one or more communications parameters.

Network communications manager 815 may manage communications with the core network (e.g., via one or more wired backhaul links). For example, the network communications manager 815 may manage the transfer of data communications for client devices, such as one or more UEs 115.

Transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the wireless device may include a single antenna 825. However, in some cases the device may have more than one antenna 825, which may be capable of concurrently transmitting or receiving multiple wireless transmissions.

The memory 830 may include RAM, ROM, or a combination thereof. The memory 830 may store computer-readable code 835 including instructions that, when executed by a processor (e.g., the processor 840) cause the device to perform various functions described herein. In some cases, the memory 830 may contain, among other things, a BIOS which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for declaring default operating frequencies).

Inter-station communications manager 845 may manage communications with other base station 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, inter-station communications manager 845 may provide an X2 interface within an LTE/LTE-A wireless communication network technology to provide communication between base stations 105.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
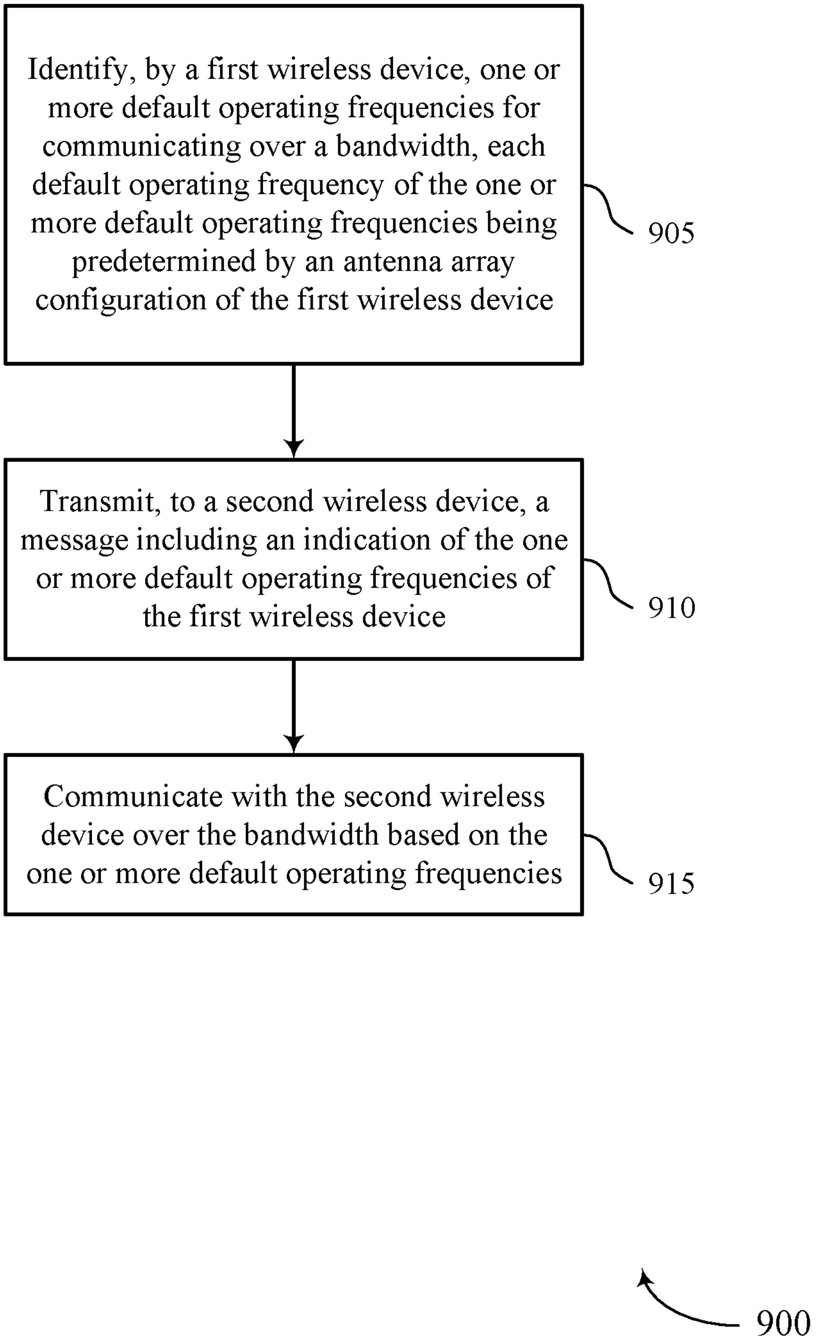
FIGS. 9 through 13 show flowcharts illustrating methods that support techniques for declaring default operating frequencies in accordance with aspects of the present disclosure.

FIG. 9 shows a flowchart illustrating a method 900 that supports techniques for declaring default operating frequencies in accordance with aspects of the present disclosure. The operations of method 900 may be implemented by wireless device, such as a UE 115, or a base station 105, or a CPE, or an IAB node, or a repeater, or a sidelink node, or another device in a wireless network, or its components as described herein. For example, the operations of method 900 may be performed by a communications manager as described with reference to FIGS. 4 through 8. In some examples, a wireless device may execute a set of instructions to control the functional elements of the wireless device to perform the functions described herein. Additionally or alternatively, a UE or base station may perform aspects of the functions described herein using special-purpose hardware.

At 905, the wireless device may identify one or more default operating frequencies for communicating over a bandwidth, each default operating frequency of the one or more default operating frequencies being predetermined by an antenna array configuration of the first wireless device. The operations of 905 may be performed according to the methods described herein. In some examples, aspects of the operations of 905 may be performed by an operating frequency manager as described with reference to FIGS. 4 through 8.

At 910, the wireless device may transmit, to a second wireless device, a message including an indication of the one or more default operating frequencies of the first wireless device. The operations of 910 may be performed according to the methods described herein. In some examples, aspects of the operations of 910 may be performed by a messaging component as described with reference to FIGS. 4 through 8.

At 915, the wireless device may communicate with the second wireless device over the bandwidth based on the one or more default operating frequencies. The operations of 915 may be performed according to the methods described herein. In some examples, aspects of the operations of 915 may be performed by a communication component as described with reference to FIGS. 4 through 8.

Figure 10:
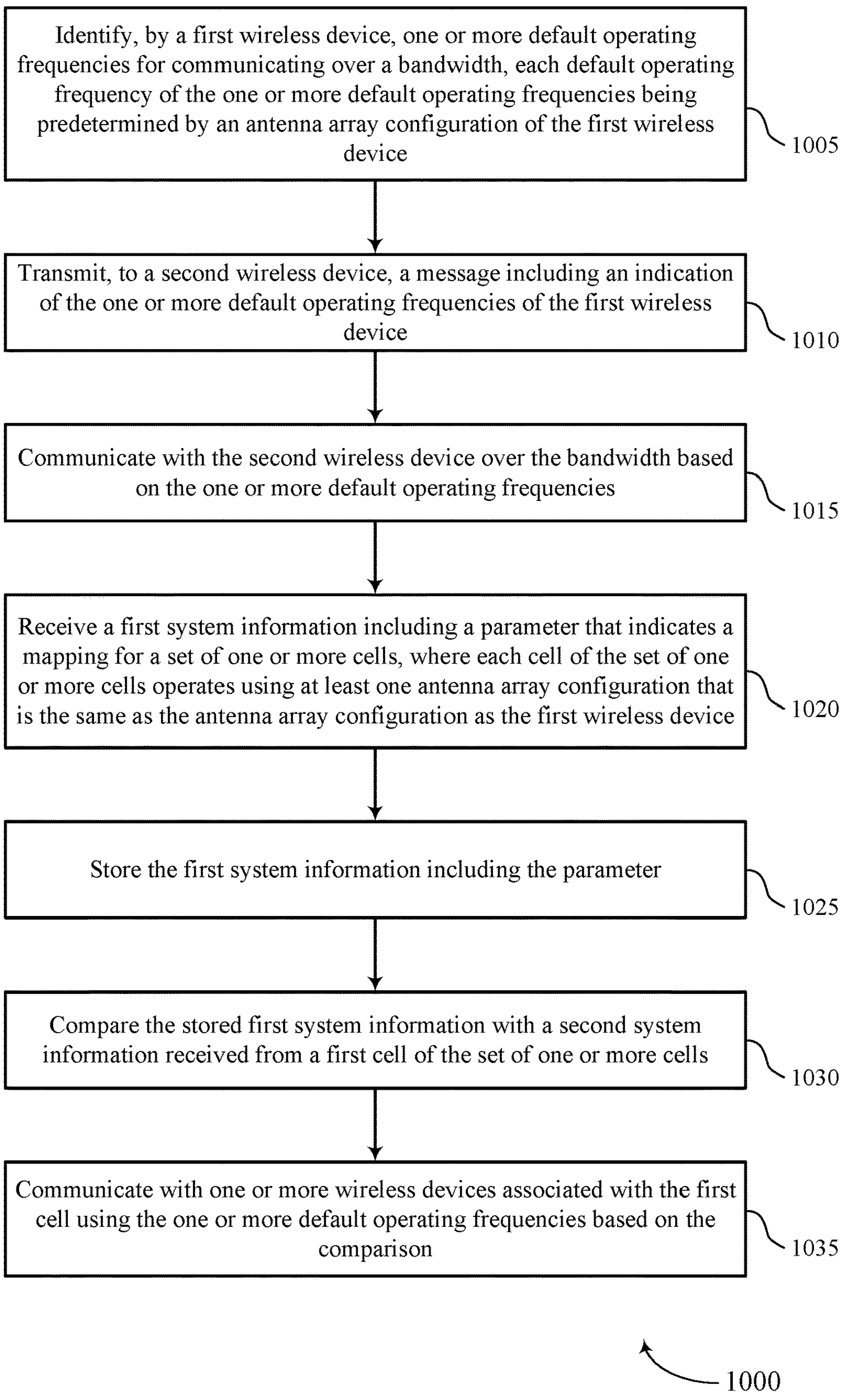

FIG. 10 shows a flowchart illustrating a method 1000 that supports techniques for declaring default operating frequencies in accordance with aspects of the present disclosure. The operations of method 1000 may be implemented by wireless device, such as a UE 115, or a base station 105, or a CPE, or an IAB node, or a repeater, or a sidelink node, or another device in a wireless network, or its components as described herein. For example, the operations of method 1000 may be performed by a communications manager as described with reference to FIGS. 4 through 8. In some examples, a wireless device may execute a set of instructions to control the functional elements of the wireless device to perform the functions described herein. Additionally or alternatively, a wireless device may perform aspects of the functions described herein using special-purpose hardware.

At 1005, the wireless device may identify one or more default operating frequencies for communicating over a bandwidth, each default operating frequency of the one or more default operating frequencies being predetermined by an antenna array configuration of the first wireless device. The operations of 1005 may be performed according to the methods described herein. In some examples, aspects of the operations of 1005 may be performed by an operating frequency manager as described with reference to FIGS. 4 through 8.

At 1010, the wireless device may transmit, to a second wireless device, a message including an indication of the one or more default operating frequencies of the first wireless device. The operations of 1010 may be performed according to the methods described herein. In some examples, aspects of the operations of 1010 may be performed by a messaging component as described with reference to FIGS. 4 through 8.

At 1015, the wireless device may communicate with the second wireless device over the bandwidth based on the one or more default operating frequencies. The operations of 1015 may be performed according to the methods described herein. In some examples, aspects of the operations of 1015 may be performed by a communication component as described with reference to FIGS. 4 through 8.

At 1020, the wireless device may receive a first system information including a parameter that indicates a mapping for a set of one or more cells, where each cell of the set of one or more cells operates using at least one antenna array configuration that is the same as the antenna array configuration as the first wireless device. The operations of 1020 may be performed according to the methods described herein. In some examples, aspects of the operations of 1020 may be performed by a system information manager as described with reference to FIGS. 4 through 8.

At 1025, the wireless device may store the first system information including the parameter. The operations of 1025 may be performed according to the methods described herein. In some examples, aspects of the operations of 1025 may be performed by a system information manager as described with reference to FIGS. 4 through 8.

At 1030, the wireless device may compare the stored first system information with a second system information received from a first cell of the set of one or more cells. The operations of 1030 may be performed according to the methods described herein. In some examples, aspects of the operations of 1030 may be performed by a system information manager as described with reference to FIGS. 4 through 8.

At 1035, the wireless device may communicate with one or more wireless devices associated with the first cell using the one or more default operating frequencies based on the comparison. The operations of 1035 may be performed according to the methods described herein. In some examples, aspects of the operations of 1035 may be performed by a communication component as described with reference to FIGS. 4 through 8.

Figure 11:
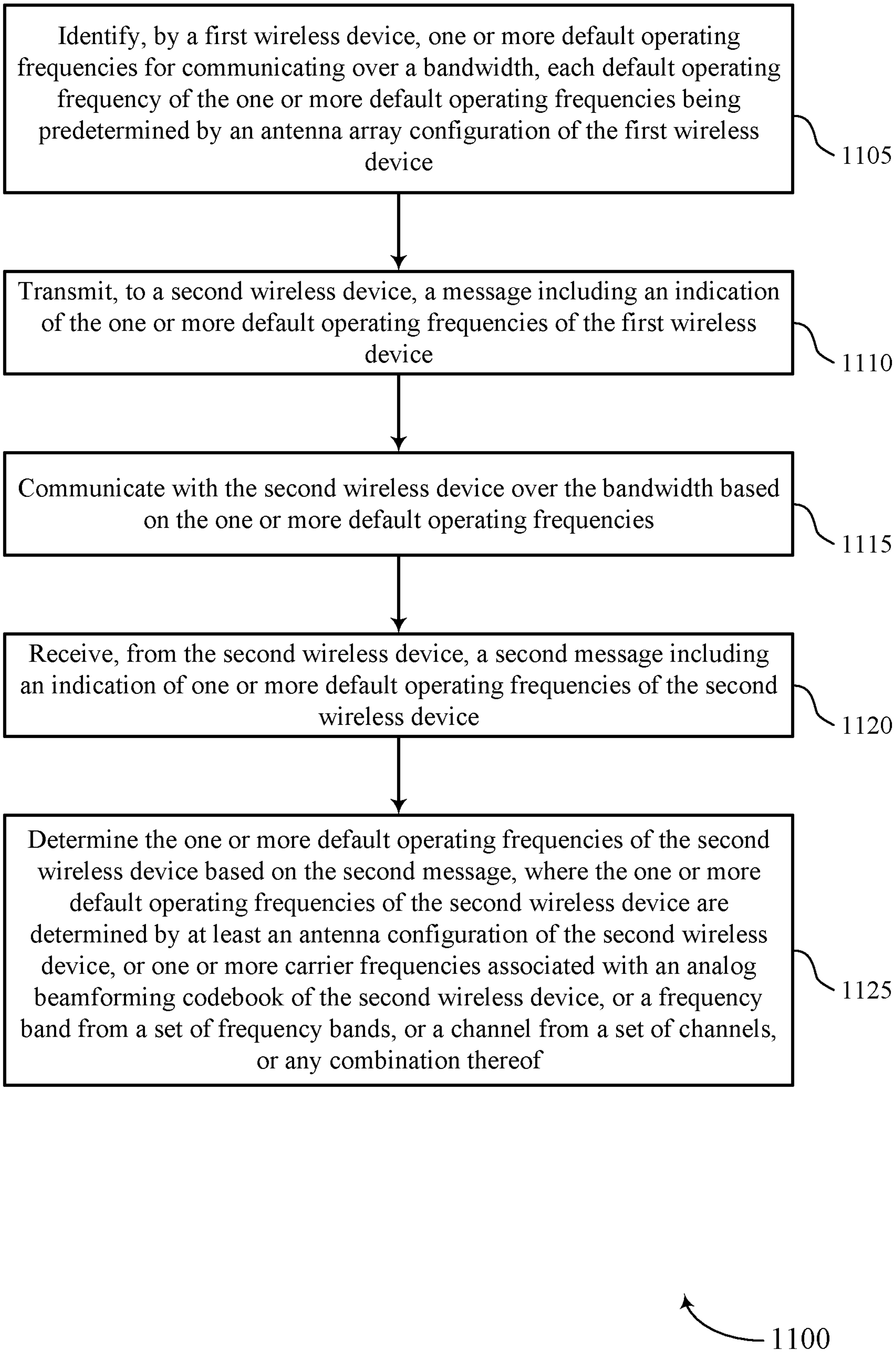

FIG. 11 shows a flowchart illustrating a method 1100 that supports techniques for declaring default operating frequencies in accordance with aspects of the present disclosure.

The operations of method 1100 may be implemented by wireless device, such as a UE 115, or a base station 105, or a CPE, or an IAB node, or a repeater, or a sidelink node, or another device in a wireless network, or its components as described herein. For example, the operations of method 1100 may be performed by a communications manager as described with reference to FIGS. 4 through 8. In some examples, a wireless device may execute a set of instructions to control the functional elements of the wireless device to perform the functions described herein. Additionally or alternatively, a wireless device may perform aspects of the functions described herein using special-purpose hardware.

At 1105, the wireless device may identify one or more default operating frequencies for communicating over a bandwidth, each default operating frequency of the one or more default operating frequencies being predetermined by an antenna array configuration of the first wireless device. The operations of 1105 may be performed according to the methods described herein. In some examples, aspects of the operations of 1105 may be performed by an operating frequency manager as described with reference to FIGS. 4 through 8.

At 1110, the wireless device may transmit, to a second wireless device, a message including an indication of the one or more default operating frequencies of the first wireless device. The operations of 1110 may be performed according to the methods described herein. In some examples, aspects of the operations of 1110 may be performed by a messaging component as described with reference to FIGS. 4 through 8.

At 1115, the wireless device may communicate with the second wireless device over the bandwidth based on the one or more default operating frequencies. The operations of 1115 may be performed according to the methods described herein. In some examples, aspects of the operations of 1115 may be performed by a communication component as described with reference to FIGS. 4 through 8.

At 1120, the wireless device may receive, from the second wireless device, a second message including an indication of one or more default operating frequencies of the second wireless device. The operations of 1120 may be performed according to the methods described herein. In some examples, aspects of the operations of 1120 may be performed by a messaging component as described with reference to FIGS. 4 through 8.

At 1125, the wireless device may determine the one or more default operating frequencies of the second wireless device based on the second message, where the one or more default operating frequencies of the second wireless device are determined by at least an antenna configuration of the second wireless device, or one or more carrier frequencies associated with an analog beamforming codebook of the second wireless device, or a frequency band from a set of frequency bands, or a channel from a set of channels, or any combination thereof. The operations of 1125 may be performed according to the methods described herein. In some examples, aspects of the operations of 1125 may be performed by an operating frequency manager as described with reference to FIGS. 4 through 8.

Figure 12:
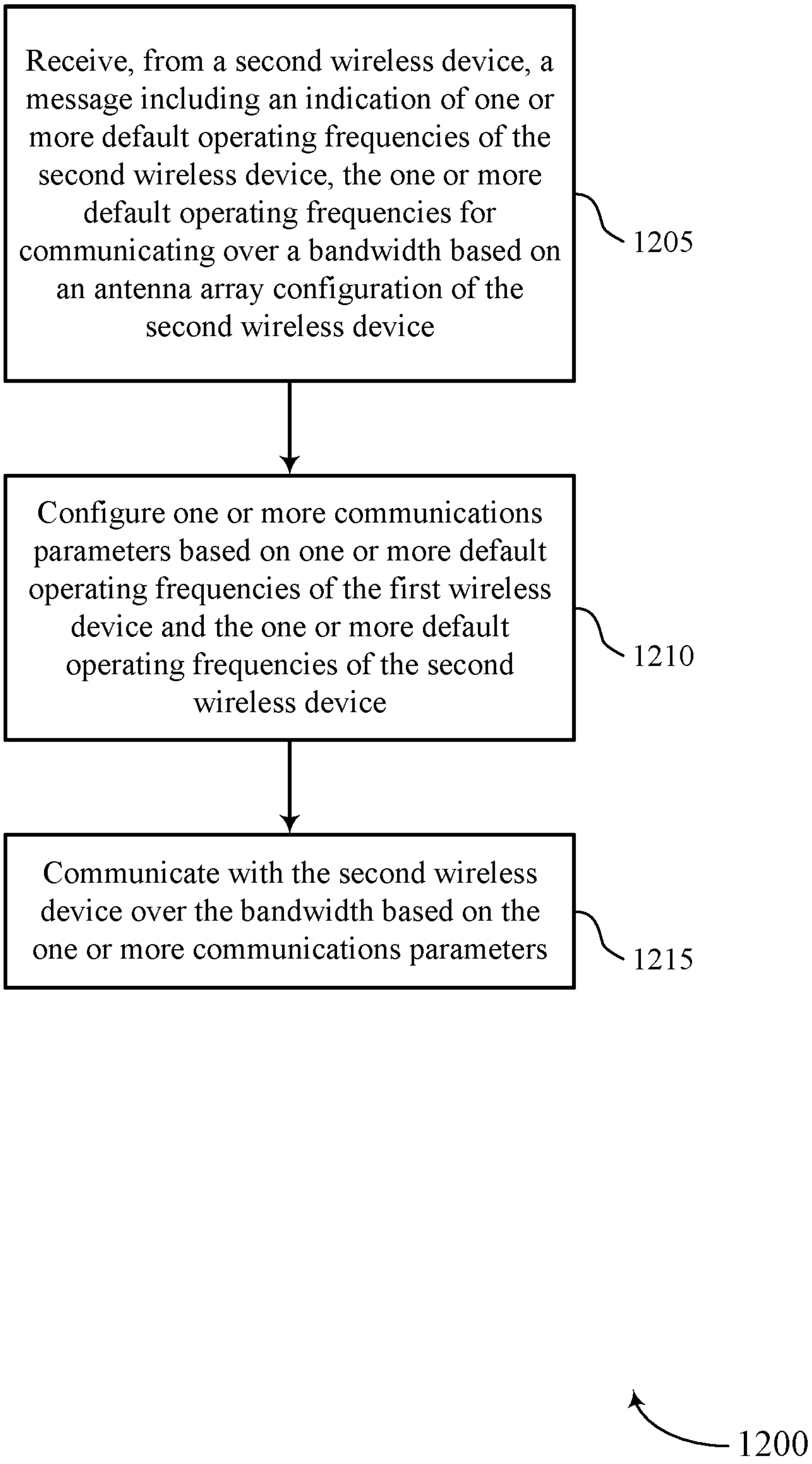

FIG. 12 shows a flowchart illustrating a method 1200 that supports techniques for declaring default operating frequencies in accordance with aspects of the present disclosure. The operations of method 1200 may be implemented by wireless device, such as a UE 115, or a base station 105, or a CPE, or an IAB node, or a repeater, or a sidelink node, or another device in a wireless network, or its components as described herein. For example, the operations of method 1200 may be performed by a communications manager as described with reference to FIGS. 4 through 8. In some examples, a wireless device may execute a set of instructions to control the functional elements of the wireless device to perform the functions described herein. Additionally or alternatively, a wireless device may perform aspects of the functions described herein using special-purpose hardware.

At 1205, the wireless device may receive, from a second wireless device, a message including an indication of one or more default operating frequencies of the second wireless device, the one or more default operating frequencies for communicating over a bandwidth based on an antenna array configuration of the second wireless device. The operations of 1205 may be performed according to the methods described herein. In some examples, aspects of the operations of 1205 may be performed by a messaging component as described with reference to FIGS. 4 through 8.

At 1210, the wireless device may configure one or more communications parameters based on one or more default operating frequencies of the first wireless device and the one or more default operating frequencies of the second wireless device. The operations of 1210 may be performed according to the methods described herein. In some examples, aspects of the operations of 1210 may be performed by a parameter component as described with reference to FIGS. 4 through 8.

At 1215, the wireless device may communicate with the second wireless device over the bandwidth based on the one or more communications parameters. The operations of 1215 may be performed according to the methods described herein. In some examples, aspects of the operations of 1215 may be performed by a communication component as described with reference to FIGS. 4 through 8.

Figure 13:
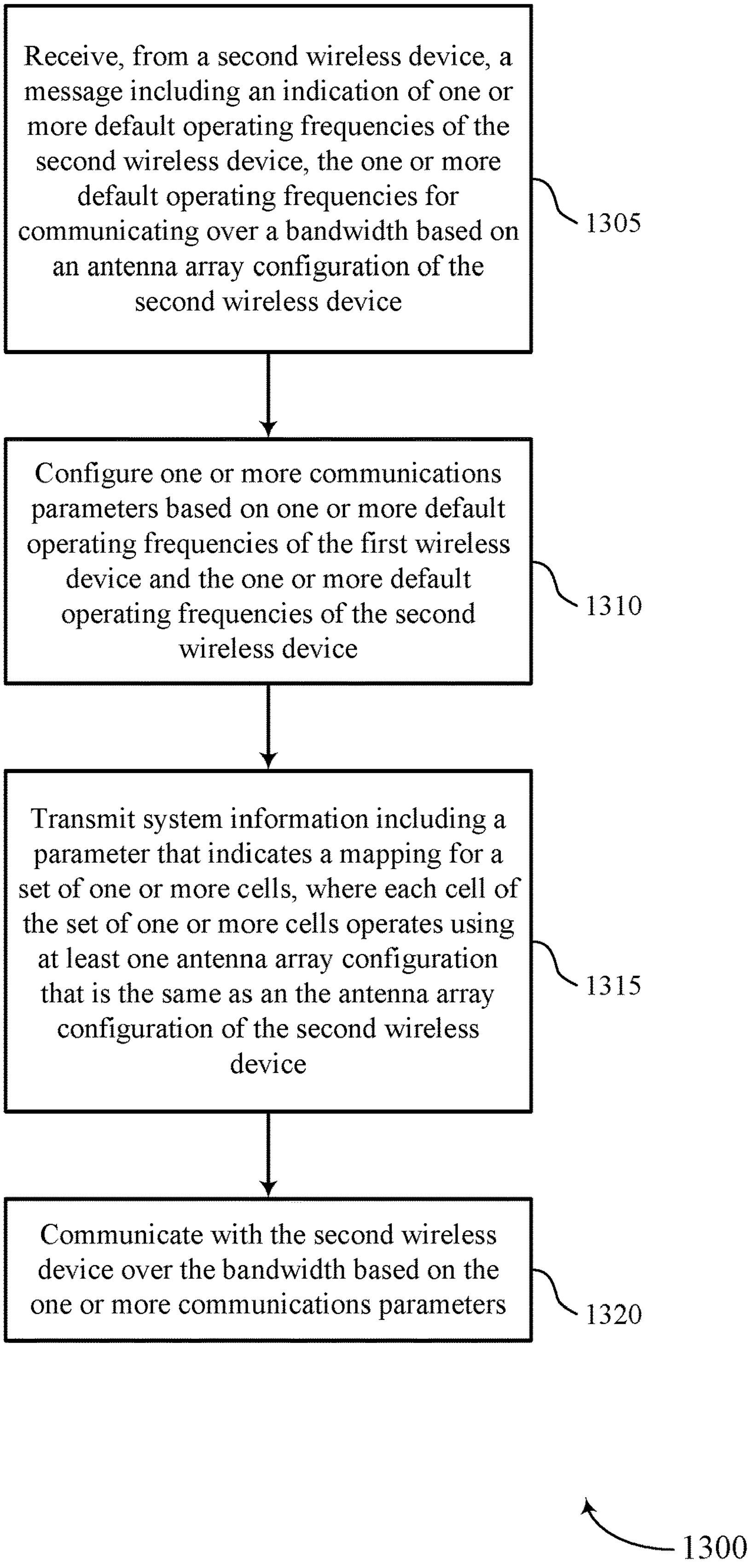

FIG. 13 shows a flowchart illustrating a method 1300 that supports techniques for declaring default operating frequencies in accordance with aspects of the present disclosure. The operations of method 1300 may be implemented by wireless device, such as a UE 115, or a base station 105, or a CPE, or an IAB node, or a repeater, or a sidelink node, or another device in a wireless network, or its components as described herein. For example, the operations of method 1300 may be performed by a communications manager as described with reference to FIGS. 4 through 8. In some examples, a wireless device may execute a set of instructions to control the functional elements of the wireless device to perform the functions described herein. Additionally or alternatively, a wireless device may perform aspects of the functions described herein using special-purpose hardware.

At 1305, the wireless device may receive, from a second wireless device, a message including an indication of one or more default operating frequencies of the second wireless device, the one or more default operating frequencies for communicating over a bandwidth based on an antenna array configuration of the second wireless device. The operations of 1305 may be performed according to the methods described herein. In some examples, aspects of the operations of 1305 may be performed by a messaging component as described with reference to FIGS. 4 through 8.

At 1310, the wireless device may configure one or more communications parameters based on one or more default operating frequencies of the first wireless device and the one or more default operating frequencies of the second wireless device. The operations of 1310 may be performed according to the methods described herein. In some examples, aspects of the operations of 1310 may be performed by a parameter component as described with reference to FIGS. 4 through 8.

At 1315, the wireless device may transmit system information including a parameter that indicates a mapping for a set of one or more cells, where each cell of the set of one or more cells operates using at least one antenna array configuration that is the same as an antenna array configuration of the second wireless device. The operations of 1315 may be performed according to the methods described herein. In some examples, aspects of the operations of 1315 may be performed by a system information manager as described with reference to FIGS. 4 through 8.

At 1320, the wireless device may communicate with the second wireless device over the bandwidth based on the one or more communications parameters. The operations of 1320 may be performed according to the methods described herein. In some examples, aspects of the operations of 1320 may be performed by a communication component as described with reference to FIGS. 4 through 8.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first wireless device, comprising: identifying, by the first wireless device, one or more default operating frequencies for communicating over a bandwidth, each default operating frequency of the one or more default operating frequencies being predetermined by an antenna array configuration of the first wireless device; transmitting, to a second wireless device, a message comprising an indication of the one or more default operating frequencies of the first wireless device; and communicating with the second wireless device over the bandwidth based at least in part on the one or more default operating frequencies.

Aspect 2: The method of aspect 1, further comprising: receiving a first system information comprising a parameter that indicates a mapping for a set of one or more cells, wherein each cell of the set of one or more cells operates using at least one antenna array configuration that is the same as the antenna array configuration as the first wireless device; storing the first system information comprising the parameter; comparing the stored first system information with a second system information received from a first cell of the set of one or more cells; and communicating with one or more wireless devices associated with the first cell using the one or more default operating frequencies based at least in part on the comparison.

Aspect 3: The method of any of aspects 1 and 2, further comprising: receiving, from the second wireless device, a second message comprising an indication of one or more default operating frequencies of the second wireless device; and determining the one or more default operating frequencies of the second wireless device based at least in part on the second message, wherein the one or more default operating frequencies of the second wireless device are determined by at least an antenna configuration of the second wireless device, or one or more carrier frequencies associated with an analog beamforming codebook of the second wireless device, or a frequency band from a set of frequency bands, or a channel from a set of channels, or any combination thereof.

Aspect 4: The method of aspect 3, further comprising: selecting one or more communications parameters based at least in part on the one or more default operating frequencies of the first wireless device and the one or more default operating frequencies of the second wireless device, wherein communicating with the second wireless device over the bandwidth is based at least in part on the selected one or more communications parameters.

Aspect 5: The method of aspect 4, wherein the one or more communications parameters comprise beamforming parameters of the analog beamforming codebook associated with an antenna array of the first wireless device.

Aspect 6: The method of any of aspects 3 through 5, further comprising: selecting at least the frequency band, or the channel, or any combination thereof, for communicating with the second wireless device based at least in part on the one or more default operating frequencies of the first wireless device and the one or more default operating frequencies of the second wireless device, wherein communicating with the second wireless device over the bandwidth is based at least in part on the selected frequency band, or the channel, or any combination thereof.

Aspect 7: The method of any of aspects 3 through 6, further comprising: determining that a first default operating frequency of the first wireless device and a second default operating frequency of the second wireless device satisfy a predetermined threshold difference; and selecting a third default operating frequency of the first wireless device based at least in part on the determination, the third default operating frequency being different from the first default operating frequency, wherein communicating with the second wireless device over the bandwidth is based at least in part on the third default operating frequency.

Aspect 8: The method of any of aspects 1 through 7, wherein identifying the one or more default operating frequencies comprises: identifying a first operating frequency boundary and a second operating frequency boundary for each default operating frequency of the one or more default operating frequencies, the first operating frequency boundary being different from the second operating frequency boundary, wherein the indication of the one or more default operating frequencies comprises an indication of at least the first operating frequency boundary, or the second operating frequency boundary, or any combination thereof.

Aspect 9: The method of aspect 8, wherein the first operating frequency boundary comprises an upper frequency boundary and the second operating frequency boundary comprises a lower frequency boundary, and one or more operating frequencies within the upper frequency boundary and the lower frequency boundary provide beamforming performance that satisfies a performance threshold, the performance threshold being based at least in part on a signal strength threshold for communications over the one or more operating frequencies.

Aspect 10: The method of any of aspects 1 through 9, wherein transmitting the message comprising the indication of the one or more default operating frequencies of the first wireless device comprises: transmitting, to the second wireless device, a capability message comprising the indication of the one or more default operating frequencies of the first wireless device.

Aspect 11: The method of any of aspects 1 through 10, wherein transmitting the message comprising the indication of the one or more default operating frequencies of the first wireless device comprises: transmitting, to the second wireless device, control information comprising the indication of the one or more default operating frequencies of the first wireless device.

Aspect 12: The method of any of aspects 1 through 11, wherein the one or more default operating frequencies of the first wireless device indicate performance metrics for a set of frequencies over the bandwidth.

Aspect 13: The method of any of aspects 1 through 12, wherein the one or more default operating frequencies of the first wireless device indicate the antenna array configuration of the first wireless device, the antenna array configuration comprising an inter-antenna element spacing of an antenna array having uniformly-spaced antenna elements or a non-uniformly-spaced antenna elements.

Aspect 14: The method of any of aspects 1 through 13, wherein the antenna array configuration comprises a number of radio frequency chains associated with an antenna array of the first wireless device.

Aspect 15: The method of any of aspects 1 through 14, wherein the one or more default operating frequencies are specific to the first wireless device.

Aspect 16: The method of any of aspects 1 through 15, wherein the first wireless device or the second wireless device, or both, comprises a user equipment, or a customer premises equipment, or a base station, or an integrated access and backhaul node, or a wireless repeater, or a sidelink node.

Aspect 17: A method for wireless communication at a first wireless device, comprising: receiving, from a second wireless device, a message comprising an indication of one or more default operating frequencies of the second wireless device, the one or more default operating frequencies for communicating over a bandwidth based at least in part on an antenna array configuration of the second wireless device; configuring one or more communications parameters based at least in part on one or more default operating frequencies of the first wireless device and the one or more default operating frequencies of the second wireless device; and communicating with the second wireless device over the bandwidth based at least in part on the one or more communications parameters.

Aspect 18: The method of aspect 17, further comprising: transmitting system information comprising a parameter that indicates a mapping for a set of one or more cells, wherein each cell of the set of one or more cells operates using at least one antenna array configuration that is the same as the antenna array configuration of the second wireless device.

Aspect 19: The method of any of aspects 17 through 18, further comprising: identifying, based at least in part on the one or more default operating frequencies, at least the antenna array configuration of the second wireless device, or one or more carrier frequencies corresponding to an analog beamforming codebook of the second wireless device, or any combination thereof; and selecting the one or more communications parameters based at least in part on the antenna array configuration of the second wireless device, the one or more carrier frequencies, or any combination thereof.

Aspect 20: The method of any of aspects 17 through 19, further comprising: identifying, based at least in part on the one or more default operating frequencies, at least a frequency band from a set of frequency bands, or a channel from a set of channels, or any combination thereof; and selecting the one or more communications parameters based at least in part on the frequency band, or the channel, or any combination thereof.

Aspect 21: The method of any of aspects 17 through 20, further comprising: estimating analog beamforming performance for a set of frequencies over the bandwidth, wherein the one or more default operating frequencies of the second wireless device indicate performance metrics for the set of frequencies.

Aspect 22: The method of any of aspects 17 through 21, further comprising: determining that a first default operating frequency of the first wireless device and a second default operating frequency of the second wireless device satisfy a predetermined threshold difference; and selecting a third default operating frequency of the first wireless device based at least in part on the determination, the third default operating frequency being different from the first default operating frequency, wherein communicating with the second wireless device within the bandwidth is based at least in part on the third default operating frequency.

Aspect 23: The method of any of aspects 17 through 22, further comprising: identifying, from the indication of the one or more default operating frequencies, a first operating frequency boundary and a second operating frequency boundary for the one or more default operating frequencies of the second wireless device, the first operating frequency boundary being different from the second operating frequency boundary, wherein communicating with the second wireless device over the bandwidth is based at least in part on the first operating frequency boundary, or the second operating frequency boundary, or any combination thereof.

Aspect 24: The method of aspect 23, wherein the first operating frequency boundary comprises an upper frequency boundary and the second operating frequency boundary comprises a lower frequency boundary, and one or more operating frequencies within the upper frequency boundary and the lower frequency boundary provide beamforming performance that satisfies a performance threshold, the performance threshold being based at least in part on a signal strength threshold for communications over the one or more operating frequencies.

Aspect 25: The method of any of aspects 17 through 24, wherein the one or more communications parameters comprise analog beamforming parameters of an analog beamforming codebook associated with an antenna array of the second wireless device.

Aspect 26: The method of any of aspects 17 through 25, wherein receiving the indication of the one or more default operating frequencies of the second wireless device comprises: receiving, from the second wireless device, a capability message comprising the indication of the one or more default operating frequencies of the first wireless device.

Aspect 27: The method of any of aspects 17 through 26, wherein receiving the indication of the one or more default operating frequencies of the second wireless device comprises: receiving, from the second wireless device, control information comprising the indication of the one or more default operating frequencies of the first wireless device.

Aspect 28: The method of any of aspects 17 through 27, wherein the one or more default operating frequencies of the second wireless device indicate the antenna array configuration of the second wireless device, the antenna array configuration comprising an inter-antenna element spacing of an antenna array having uniformly-spaced antenna elements or a non-uniformly-spaced antenna elements.

Aspect 29: An apparatus for wireless communication at a first wireless device, comprising a processor; memory coupled with the processor; and instructions stored in the memory and executable by the processor to cause the apparatus to perform a method of any of aspects 1 through 16.

Aspect 30: An apparatus for wireless communication at a first wireless device, comprising at least one means for performing a method of any of aspects 1 through 16.

Aspect 31: A non-transitory computer-readable medium storing code for wireless communication at a first wireless device, the code comprising instructions executable by a processor to perform a method of any of aspects 1 through 16.

Aspect 32: An apparatus for wireless communication at a first wireless device, comprising a processor; memory coupled with the processor; and instructions stored in the memory and executable by the processor to cause the apparatus to perform a method of any of aspects 17 through 28.

Aspect 33: An apparatus for wireless communication at a first wireless device, comprising at least one means for performing a method of any of aspects 17 through 28.

Aspect 34: A non-transitory computer-readable medium storing code for wireless communication at a first wireless device, the code comprising instructions executable by a processor to perform a method of any of aspects 17 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless device, comprising:

identifying, by the first wireless device, one or more default operating frequencies for communicating over a bandwidth, each default operating frequency of the one or more default operating frequencies being predetermined by an inter-antenna element spacing of an antenna array configuration of the first wireless device;

transmitting, to a second wireless device, control information comprising an indication of at least one first default operating frequency of the one or more default operating frequencies of the first wireless device selected based at least in part on a change in a measured interference of at least one second default operating frequency of the one or more default operating frequencies;

receiving, based at least in part on the indication of the one or more default operating frequencies, a first system information comprising a parameter that indicates a plurality of cells each operating using at least one antenna array configuration that is the same as the antenna array configuration of the first wireless device, wherein the parameter indicates that the second wireless device associated with a cell of the plurality of cells operates using at least one antenna array configuration having a corresponding inter-antenna element spacing that is within a threshold value of the inter-antenna element spacing of the antenna array configuration of the first wireless device, and wherein the parameter indicates a first default operating frequency of the second wireless device; and communicating with the second wireless device over the bandwidth based at least in part on receiving the first system information and in accordance with a difference between a second default operating frequency of the one or more default operating frequencies of the first wireless device and the first default operating frequency of the second wireless device satisfying a threshold difference.

2. The method of claim 1, further comprising:

storing the first system information comprising the parameter;

comparing the stored first system information with a second system information received from a first cell of the plurality of cells; and communicating with one or more wireless devices associated with the first cell using the one or more default operating frequencies based at least in part on the comparison.

3. The method of claim 1, further comprising:

receiving, from the second wireless device, a second message comprising an indication of one or more default operating frequencies of the second wireless device; and determining the one or more default operating frequencies of the second wireless device based at least in part on the second message, wherein the one or more default operating frequencies of the second wireless device are determined by at least an antenna configuration of the second wireless device, or one or more carrier frequencies associated with an analog beamforming codebook of the second wireless device, or a frequency band from a set of frequency bands, or a channel from a set of channels, or any combination thereof.

4. The method of claim 3, further comprising:

selecting one or more communications parameters based at least in part on the one or more default operating frequencies of the first wireless device and the one or more default operating frequencies of the second wireless device, wherein communicating with the second wireless device over the bandwidth is based at least in part on the selected one or more communications parameters.

5. The method of claim 4, wherein the one or more communications parameters comprise beamforming parameters of the analog beamforming codebook associated with an antenna array of the first wireless device.

6. The method of claim 3, further comprising:

selecting at least the frequency band, or the channel, or any combination thereof, for communicating with the second wireless device based at least in part on the one or more default operating frequencies of the first wireless device and the one or more default operating frequencies of the second wireless device, wherein communicating with the second wireless device over the bandwidth is based at least in part on the selected frequency band, or the channel, or any combination thereof.

7. The method of claim 1, further comprising:

determining that the first default operating frequency of the second wireless device and the second default operating frequency of the one or more default operating frequencies of the first wireless device satisfy the threshold difference, wherein the threshold difference is predetermined; and selecting a third default operating frequency of the first wireless device based at least in part on the determination, the third default operating frequency being different from the first default operating frequency, wherein communicating with the second wireless device over the bandwidth is based at least in part on the third default operating frequency.

8. The method of claim 1, wherein identifying the one or more default operating frequencies comprises:

identifying a first operating frequency boundary and a second operating frequency boundary for each default operating frequency of the one or more default operating frequencies, the first operating frequency boundary being different from the second operating frequency boundary, wherein the indication of the one or more default operating frequencies comprises an indication of at least the first operating frequency boundary, or the second operating frequency boundary, or any combination thereof.

9. The method of claim 8, wherein the first operating frequency boundary comprises an upper frequency boundary and the second operating frequency boundary comprises a lower frequency boundary, and wherein one or more operating frequencies within the upper frequency boundary and the lower frequency boundary provide beamforming performance that satisfies a performance threshold, the performance threshold being based at least in part on a signal strength threshold for communications over the one or more operating frequencies.

10. The method of claim 1, wherein the one or more default operating frequencies of the first wireless device indicate performance metrics for a set of frequencies over the bandwidth.

11. The method of claim 1, wherein the one or more default operating frequencies of the first wireless device indicate the antenna array configuration of the first wireless device, the antenna array configuration comprising the inter-antenna element spacing of an antenna array having uniformly-spaced antenna elements or non-uniformly-spaced antenna elements.

12. The method of claim 1, wherein the antenna array configuration comprises a number of radio frequency chains associated with an antenna array of the first wireless device.

13. The method of claim 1, wherein the one or more default operating frequencies are specific to the first wireless device.

14. The method of claim 1, wherein the first wireless device or the second wireless device, or both, comprises a user equipment, or a customer premises equipment, or a base station, or an integrated access and backhaul node, or a wireless repeater, or a sidelink node.

15. A method for wireless communication at a first wireless device, comprising:

receiving, from a second wireless device, control information comprising an indication of at least one first default operating frequency of one or more default operating frequencies of the second wireless device selected based at least in part on a change in a measured interference of at least one second default operating frequency of the one or more default operating frequencies, the one or more default operating frequencies for communicating over a bandwidth based at least in part on an inter-antenna element spacing of an antenna array configuration of the second wireless device;

transmitting, based at least in part on the indication of the one or more default operating frequencies, a first system information comprising a parameter that indicates a plurality of cells each operating using at least one antenna array configuration that is the same as the antenna array configuration of the second wireless device, wherein the parameter indicates that the first wireless device is associated with a cell of the plurality of cells and operates using at least one antenna array configuration having a corresponding inter-antenna element spacing that is within a threshold value of the inter-antenna element spacing of the antenna array configuration of the second wireless device, and wherein the parameter indicates a first default operating frequency of the first wireless device;

configuring one or more communications parameters based at least in part on a difference between a second default operating frequency of the one or more default operating frequencies of the second wireless device and the first default operating frequency of the first wireless device satisfying a threshold difference; and communicating with the second wireless device over the bandwidth based at least in part on the difference satisfying the threshold difference and based at least in part on transmitting the first system information and in accordance with the one or more communications parameters.

16. The method of claim 15, further comprising:

identifying, based at least in part on the one or more default operating frequencies, at least the antenna array configuration of the second wireless device, or one or more carrier frequencies corresponding to an analog beamforming codebook of the second wireless device, or any combination thereof; and selecting the one or more communications parameters based at least in part on the antenna array configuration of the second wireless device, the one or more carrier frequencies, or any combination thereof.

17. The method of claim 15, further comprising:

identifying, based at least in part on the one or more default operating frequencies, at least a frequency band from a set of frequency bands, or a channel from a set of channels, or any combination thereof; and selecting the one or more communications parameters based at least in part on the frequency band, or the channel, or any combination thereof.

18. The method of claim 15, further comprising:

estimating analog beamforming performance for a set of frequencies over the bandwidth, wherein the one or more default operating frequencies of the second wireless device indicate performance metrics for the set of frequencies.

19. The method of claim 15, further comprising:

determining that the first default operating frequency of the first wireless device and the second default operating frequency of the one or more default operating frequencies of the second wireless device satisfy the threshold difference, wherein the threshold difference is predetermined; and selecting a third default operating frequency of the first wireless device based at least in part on the determination, the third default operating frequency being different from the first default operating frequency, wherein communicating with the second wireless device within the bandwidth is based at least in part on the third default operating frequency.

20. The method of claim 15, further comprising:

identifying, from the indication of the one or more default operating frequencies, a first operating frequency boundary and a second operating frequency boundary for the one or more default operating frequencies of the second wireless device, the first operating frequency boundary being different from the second operating frequency boundary, wherein communicating with the second wireless device over the bandwidth is based at least in part on the first operating frequency boundary, or the second operating frequency boundary, or any combination thereof.

21. The method of claim 20, wherein the first operating frequency boundary comprises an upper frequency boundary and the second operating frequency boundary comprises a lower frequency boundary, and wherein one or more operating frequencies within the upper frequency boundary and the lower frequency boundary provide beamforming performance that satisfies a performance threshold, the performance threshold being based at least in part on a signal strength threshold for communications over the one or more operating frequencies.

22. The method of claim 15, wherein the one or more communications parameters comprise analog beamforming parameters of an analog beamforming codebook associated with an antenna array of the second wireless device.

23. The method of claim 15, wherein the one or more default operating frequencies of the second wireless device indicate the antenna array configuration of the second wireless device, the antenna array configuration of the second wireless device comprising the inter-antenna element spacing of an antenna array having uniformly-spaced antenna elements or non-uniformly-spaced antenna elements.

24. An apparatus for wireless communication at a first wireless device, comprising:

one or more processors, memory coupled with the one or more processors; and instructions stored in the memory and executable by the one or more processors to cause the apparatus to:

identify, by the first wireless device, one or more default operating frequencies for communicating over a bandwidth, each default operating frequency of the one or more default operating frequencies being predetermined by an inter-antenna element spacing of an antenna array configuration of the first wireless device;

transmit, to a second wireless device, control information comprising an indication of at least one first default operating frequency of the one or more default operating frequencies of the first wireless device selected based at least in part on a change in a measured interference of at least one second default operating frequency of the one or more default operating frequencies;

receive, based at least in part on the indication of the one or more default operating frequencies, a first system information comprising a parameter that indicates a plurality of cells each operating using at least one antenna array configuration that is the same as the antenna array configuration of the first wireless device, wherein the parameter indicates that the second wireless device associated with a cell of the plurality of cells operates using at least one antenna array configuration having a corresponding inter-antenna element spacing that is within a threshold value of the inter-antenna element spacing of the antenna array configuration of the first wireless device, and wherein the parameter indicates a first default operating frequency of the second wireless device; and communicate with the second wireless device over the bandwidth based at least in part on receiving the first system information and in accordance with a difference between a second default operating frequency of the one or more default operating frequencies of the first wireless device and the first default operating frequency of the second wireless device satisfying a threshold difference.

25. An apparatus for wireless communication at a first wireless device, comprising:

one or more processors, memory coupled with the one or more processors; and instructions stored in the memory and executable by the one or more processors to cause the apparatus to:

receive, from a second wireless device, control information comprising an indication of at least one first default operating frequency of one or more default operating frequencies of the second wireless device selected based at least in part on a change in a measured interference of at least one second default operating frequency of the one or more default operating frequencies, the one or more default operating frequencies for communicating over a bandwidth based at least in part on an inter-antenna element spacing of an antenna array configuration of the second wireless device;

transmit, based at least in part on the indication of the one or more default operating frequencies, a first system information comprising a parameter that indicates a plurality of cells each operating using at least one antenna array configuration that is the same as the antenna array configuration of the second wireless device, wherein the parameter indicates that the first wireless device is associated with a cell of the plurality of cells and operates using at least one antenna array configuration having a corresponding inter-antenna element spacing that is within a threshold value of the inter-antenna element spacing of the antenna array configuration of the second wireless device, and wherein the parameter indicates a first default operating frequency of the first wireless device;

configure one or more communications parameters based at least in part on a difference between a second default operating frequency of the one or more default operating frequencies of the second wireless device and the first default operating frequency of the first wireless device satisfying a threshold difference; and communicate with the second wireless device over the bandwidth based at least in part on the difference satisfying the threshold difference and based at least in part on transmitting the first system information and in accordance with the one or more communications parameters.

* * * * *